(12) United States Patent
Nagayama et al.

(10) Patent No.: US 6,749,934 B2
(45) Date of Patent: Jun. 15, 2004

(54) FRP MOLDED ARTICLE AND METHOD OF PRODUCING THE SAME

(75) Inventors: Kazuki Nagayama, Otsu (JP); Hideki Nudeshima, Otsu (JP); Syuji Ishikawa, Otsu (JP); Hideaki Tanisugi, Yasu-gun (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/204,265

(22) PCT Filed: Feb. 21, 2001

(86) PCT No.: PCT/JP01/01225

§ 371 (c)(1),
(2), (4) Date: Aug. 20, 2002

(87) PCT Pub. No.: WO01/62468

PCT Pub. Date: Aug. 30, 2001

(65) Prior Publication Data

US 2003/0026984 A1 Feb. 6, 2003

(30) Foreign Application Priority Data

Feb. 24, 2000 (JP) .......................................... 2000-047660

(51) Int. Cl.[7] ................................................. D02G 3/00
(52) U.S. Cl. ........................ 428/364; 428/401; 428/220; 428/400; 428/292.1
(58) Field of Search ................................. 428/364, 400, 428/401, 367, 292.1, 220; 264/257, 258, 328.16, 328.18, 328.19

(56) References Cited

U.S. PATENT DOCUMENTS

| 5,069,840 | A | | 12/1991 | Arnott .......................... 264/69 |
| 5,275,776 | A | * | 1/1994 | Hara et al. |
| 5,424,020 | A | * | 6/1995 | Hara et al. |

FOREIGN PATENT DOCUMENTS

| EP | 439625 A | 8/1991 |
| JP | 07-108557 A | 4/1995 |
| JP | 07-241879 A | 9/1995 |
| JP | 11-042683 A | 2/1999 |
| JP | 11-115829 A | 4/1999 |
| JP | 11-272198 A | 10/1999 |

* cited by examiner

Primary Examiner—Merrick Dixon
(74) Attorney, Agent, or Firm—Kubovcik & Kubovcik

(57) ABSTRACT

An FRP molded article molded by hot runner injection molding with a mixture of thermoplastic resin and reinforcing fibers of 0.1–7 mm in average length dispersed in the thermoplastic resin; and a hot runner injection molding method therefore. The molded article is preferable for use as a housing for electronic terminal equipment, cellular phones, etc.

12 Claims, 27 Drawing Sheets

FRP MOLDED ARTICLE AND METHOD OF PRODUCING THE SAME

TECHNICAL FIELD

The present invention relates to an FRP molded article and a production process thereof.

The FRP molded article of the invention comprises a thermoplastic resin used as a matrix resin and reinforcing fibers having an average fiber length of 0.1 to 7 mm dispersed in the matrix resin. The FRP molded article is thin-walled and has excellent mechanical properties and low volume resistivity. It can be preferably used as a housing of an electronic terminal machine or device, portable cellular phone, etc.

The molded article of the invention can be produced by a hot-runner injection molding method.

BACKGROUND ART

Injection-molded articles made from synthetic resins are widely used, for example, as structural parts such as functional parts and mechanical parts, and housings of office machines and devices, electronic terminal machines and devices, portable cellular phones, etc. Especially the injection-molded articles made from carbon fiber-reinforced resins are widely used as housings of computer terminal machines and apparatuses, portable cellular phones, etc., since they have excellent mechanical properties and high electromagnetic wave shielding capability.

Molded thermoplastic resin articles are mostly produced by injection molding methods. When a desired injection molded article made from a thermoplastic resin is produced by an injection molding method, the portions called sprue runners to be thrown away after molding are formed in addition to the portion destined to be a product. Usually the rate by weight of the sprue runners to the molded article is small, and the shapes of the sprue runners do not pose any large problem.

However, in the case where a molded article reinforced by carbon fibers or other reinforcing fibers is produced by an injection molding method, especially in the case where a complicatedly shaped large-sized molded article like a housing of a terminal machine or device of a personal computer is produced by an injection molding method, a molten resin composed of a mixture of a thermoplastic resin and reinforcing fibers is poor in flowability. Therefore, multi-gate molding, in which many gates are used for injecting the molten resin, is employed. In this case, the rate by weight of a sprue runner portion in a molded article thereto becomes large and as a result material to be thrown away increases.

A thermoplastic resin reinforced by reinforcing fibers is high in the unit cost of material compared with general engineering plastics. Therefore, in the conventional molding methods, in which the number of sprue runners to be thrown away is large, the cost of the molded article is inevitably higher.

If sprue runners exist, flow resistance acts on the molten resin flowing there, to break and thin the reinforcing fibers contained in the molten resin. As a result, the physical properties of the obtained molded article decline.

Injection molding using hot runners is already practically used for molding of thermoplastic engineering plastics not containing reinforcing fibers.

On the other hand, several cases are known, in which a thermoplastic resin containing reinforcing fibers is molded by means of injection molding using hot runners. However, no attempt is known, in which a thermoplastic resin containing carbon fibers as reinforcing fibers is molded by means of injection molding using hot runners.

One reason is that in the case where a thermoplastic resin reinforced by reinforcing fibers is molded by means of hot-runner injection molding, it is feared that the product becomes poor in appearance and is warped. As another reason, since no means for technically overcoming the feared defects has been examined, molded article manufacturers consider that there is a risk in employing the technique for producing sellable molded articles.

An object of the invention is to greatly reduce sprue runners that raise the cost of the injection-molded article made from a highly functional material, i.e., a thermoplastic resin reinforced by reinforcing fibers, and another object is to provide an injection molded article made from a thermoplastic resin reinforced by reinforcing fibers, which is substantially free from defects such as poor appearance and warping.

DISCLOSURE OF THE INVENTION

The FRP molded article of the invention to achieve the above-mentioned objects is as follows:

An FRP molded article comprising a thermoplastic resin and resin-reinforcing fibers having an average fiber length of 0.1 to 7 mm dispersed in said thermoplastic resin, produced by a hot-runner injection molding.

In the FRP molded article of the invention, it is preferable that the fibers are at least one kind of fibers selected from a group consisting of carbon fibers, glass fibers and aramid fibers.

In the FRP molded article of the invention, it is preferable that the length of the hot-runner sprue used in the hot-runner injection molding is 10 to 600 mm.

In the FRP molded article of the invention, it is preferable that the depression formed by the tip of a gate pin used for opening and closing a gate provided at the tip of the hot-runner sprue exists on the surface of the molded article.

In the FRP molded article of the invention, it is preferable that the depression has a diameter of 0.1 to 10 mm and a depth of 2 mm or less.

In the FRP molded article of the invention, it is preferable that the hot-runner injection molding has plural hot-runner sprues having opening-closing gates at the tips thereof respectively and each of the opening-closing gates is controlled independently each other.

In the FRP molded article of the invention, it is preferable that the hot-runner sprue comprises plural hot-runner sprues and a resin passing through a first sprue of an injection molding machine communicating to the plural hot-runner sprues passes through respective resin passages and is injected from the respective gates provided at the tips of the respective hot-runner sprues substantially at the same timing.

In the FRP molded article of the invention, it is preferable that the geometrical lengths of the respective resin passages are equal to each other.

In the FRP molded article of the invention, it is preferable that there are time differences in the opening and closing timings of the respective gates.

In the FRP molded article of the invention, it is preferable that the molded article is an equipment body.

The process for producing the FRP molded article of the invention for achieving the above-mentioned objects is as follows:

A process for producing an FRP molded article, comprising:
- (a) a first step, in which resin pellets having resin-reinforcing fibers having an average fiber length of 0.1 to 7 mm mixed in a thermoplastic resin used as a matrix resin are heated and molten at 220 to 350° C. in a resin-melting cylinder of an injection molding machine, to prepare a molten resin having the fibers dispersed therein, and
- (b) a second step, in which the molten resin obtained in the first step is fed to a hot-runner sprue through a first sprue of the injection molding machine and further through the resin passage of a hot-runner injection molding apparatus; the gate of the hot-runner sprue is opened and closed to control the start and end of injection of the molten resin into a cavity of a mold used for molding an article; the molten resin fed into the cavity is solidified in the mold; the mold is opened; and the molded article is taken out.

In the process for producing an FRP molded article of the invention, it is preferred that the length of the hot-runner sprue is 10 to 600 mm.

In the process for producing an FRP molded article of the invention, it is preferred that the gate is opened and closed by a gate pin going into and out of the gate, and that a depression is formed on the surface of the molded article by the tip of the gate pin.

In the process for producing an FRP molded article of the invention, it is preferred that the depression has a diameter of 0.1 to 10 mm and a depth of 2 mm or less.

In the process for producing an FRP molded article of the invention, it is preferred that the hot-runner sprue comprises plural hot-runner sprues and the opening and closing of the respective gates provided at the tips of the plural hot-runner sprues can be controlled respectively independently.

In the process for producing an FRP molded article of the invention, it is preferred that the hot-runner sprue comprises plural hot-runner sprues, and the resin passing through a first sprue of an injection molding machine communicating to the plural hot-runner sprues passes through respective resin passages and is injected from the respective gates at the tips of the respective hot-runner sprues at the same timing.

In the process for producing an FRP molded article of the invention, it is preferred that the geometrical lengths of the respective resin passages are equal to each other.

In the process for producing an FRP molded article of the invention, it is preferred that there are time differences in the opening and closing timings of the respective gates.

THE BEST MODES FOR CARRYING OUT THE INVENTION

Figure 1:
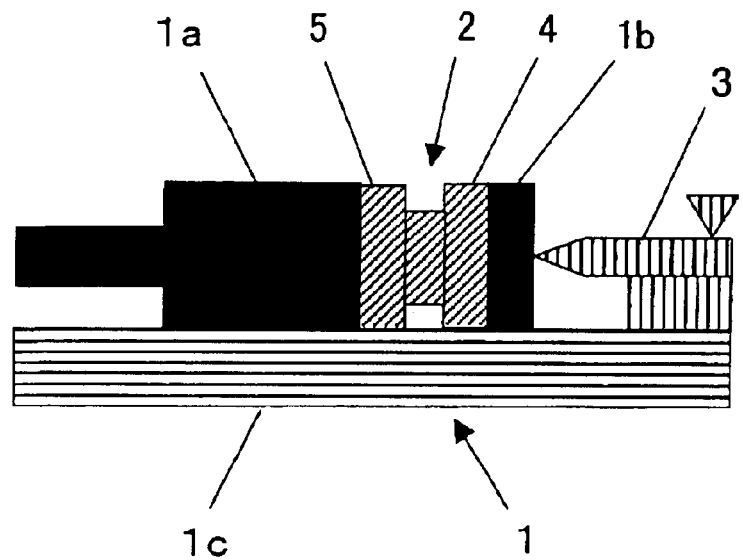
FIG. 1 is a typical side view of an injection molding apparatus provided with a hot runner for producing a molded article of the invention.

A thermoplastic resin used for producing an FRP molded article of the invention is not especially limited if it can be injection-molded. A polyamide resin or a polycarbonate resin can be preferably used.

The polyamide resin refers to a compound having an acid amide bond (—CONH—) bond in the molecule. Examples of the polyamide resin include homopolymers and copolymers obtained from ε-caprolactam, 6-aminocaproic acid, (ω-enantholactam, 7-aminoheptanoic acid, 11-aminoundecanoic acid, 9-aminononanoic acid, α-pyrrolidone, α-pyrelidone, etc., homopolymers and copolymers obtained by polycondensing a diamine such as hexamethylenediamine, nonamethylenediamine, undecamethylenediamine, dodecamethylenediamine or metaxylylenediamine and a dicarboxylic acid such as terephthalic acid, isophthalic acid, adipic acid or sebacic acid, and their blends.

In view of the mechanical properties and surface properties of the molded article, 6-nylon and 66-nylon can be preferably used, and especially 6-nylon can be preferably used.

The polyamide resin can also be mixed with another resin. Examples of the resin that can be mixed include polypropylene, ABS resin, polyphenylene oxide, polycarbonates, polyethylene terephthalate, polybutylene terephthalate, liquid crystal polyesters, etc.

In the case where a polymer having, for example, an ester reactive with a polyamide is mixed, the polyamide can be made to react with, for example, an acid anhydride beforehand for blocking the ends of the polyamide, in order to inhibit the reaction as required.

A polyamide resin has very high toughness and excellent mechanical strength.

A polycarbonate resin is a polyester represented by the following formula and obtained from carbonic acid and a glycol or dihydric phenol.

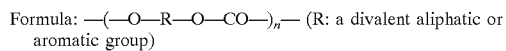

Formula: —(—O—R—O—CO—)$_n$— (R: a divalent aliphatic or aromatic group)

It is preferred that R is a diphenyl alkane having a structure represented by the following formula, since a high melting point, and excellent heat resistance, light resistance, acid resistance, etc. can be obtained.

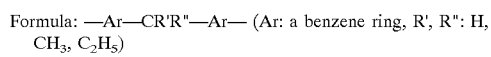

Formula: —Ar—CR'R"—Ar— (Ar: a benzene ring, R', R": H, CH$_3$, C$_2$H$_5$)

Especially a polycarbonate having 2,2-bis(4-oxyphenyl) propane represented by the following formula is preferred.

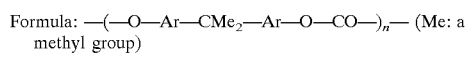

Formula: —(—O—Ar—CMe$_2$—Ar—O—CO—)$_n$— (Me: a methyl group)

The hydrogen atoms, etc. of the polycarbonate can also be substituted by halogens, hydrocarbon groups, etc.

The polycarbonate resin can be as it is, or can also be provided as an adequate alloy.

A polycarbonate/ABS (acrylonitrile-butadiene-styrene) (a preferred mixing ratio by weight is 20/80 to 80/20, and a more preferred ratio is 40/60 to 60/40), a polycarbonate/ ASA (acrylonitrile-styrene-acryl rubber) (a preferred mixing ratio by weight is 20/80 to 80/20, and a more preferred ratio is 40/60 to 60/40), an alloy with another resin, a mixture with another resin, etc. can also be preferably used.

A polycarbonate resin has low shrinkage and excellent warping resistance.

Thermoplastic resins other than polyamide resins and polycarbonate resins include polyolefin resins such as styrene resin, polyethylene and polypropylene, polyester resins such as polyphenylene ether resin, polyethylene terephthalate (PET) and polybutylene terephthalate (PBT), etc.

Any one of these thermoplastic resins can be used or some of them can also be used as a mixture or copolymer. In the case of a mixture, a compatibilizing agent can also be used together.

A flame retarder such as bromine flame retarder, silicone flame retarder or red phosphorus can also be added. A phosphoric ester or carbon black can also be added.

In the case where a mixture consisting of plural resins is used as the thermoplastic resin, it is preferred that a polyamide resin or polycarbonate resin is a main ingredient, and that the content of the main ingredient is 60 wt % or more.

The mixture can also contain 0.1 to 10 wt % of a flame retarder or 0.1 to 30 wt % of carbon black, etc.

Depending on the application of the molded article, for example, a dye, pigment, moldability improving agent and foaming agent can be added.

It is preferred that the molded article contains 30 to 95 wt % of a thermoplastic resin. A more preferred range is 40 to 90 wt %. If the amount of the thermoplastic resin is smaller than the range, the flowability during molding becomes low since the amount of the resin is too small. If the amount is larger than the range, the effect of reinforcing fibers becomes small since the amount of the resin is too large.

The reinforcing fibers used in the FRP molded article of the invention can be glass fibers, carbon fibers, aramid fibers, etc.

In view of the bending properties and strength of the molded article, it is preferred that the tensile modulus of elasticity of the reinforcing fibers themselves is 10,000 to 50,000 kgf/mm$^2$. A more preferred range is 20,000 to 30,000 kgf/mm$^2$. Similarly it is preferred that the tensile strength of the reinforcing fibers themselves is 200 to 600 kgf/mm$^2$. A more preferred range is 300 to 550 kgf/mm$^2$.

In view of moldability, property exhibition rate, etc., it is preferred that the molded article contain 5 to 30 wt % of reinforcing fibers. A more preferred range is 15 to 30 wt %.

To satisfy the electromagnetic wave shielding capability, it is important and most effective to decrease the volume resistivity of the molded article. For this purpose, it is preferred that the volume resistivity of the molded article is 0.0001 to 0.01 Ω·m.

To improve the mechanical properties such as thermal conductivity and coefficient of linear thermal expansion of the molded article and to decrease the volume resistivity of the molded product, it is preferred to use carbon fibers as reinforcing fibers.

It is preferred that the density of carbon fibers is 1.70 to 1.95. A more preferred range is 1.76 to 1.85. It is preferred that the diameter of a single carbon fiber is 5 to 8 μm, and a more preferred range is 6.5 to 7.5 μm.

In the production of the molded article of the invention, a filler can be used. Examples of the filler include wollastonite, sepiolite, potassium titanate, xonotlite, phosphate fibers, dawsonite, gypsum fibers, molybdenum sulfide (MOS), aluminum borate, needle-like calcium carbonate, tetrapod type zinc oxide, silicon carbide, silicon nitride, vapor phase epitaxial carbon fibers, magnesium hydroxide, aluminum hydroxide, basic magnesium sulfate and their combinations.

The wollastonite, sepiolite, potassium titanate, xonotlite, phosphate fibers, dawsonite, gypsum fibers, MOS, aluminum borate, needle-like calcium carbonate, tetrapod type zinc oxide, silicon carbide, silicon nitride, vapor phase epitaxial carbon fibers, magnesium hydroxide, aluminum hydroxides and basic magnesium sulfate can also be covered with carbon or treated with a silane coupling agent, etc. on the surface, or these covered or treated fillers can also be used in combination.

In view of moldability into the molded article and the appearance of the molded article, wollastonite, sepiolite and potassium titanate are preferred, and in view of exhibition of respective properties such as warping resistance, stiffness and strength of the molded article, potassium titanate ($K_2O \cdot nTi_2$) (n=1, 2, 6, 8; n=8 is especially preferred) is more preferred.

Apart from said potassium titanate, a needle-like filler in any of various modes of titanium element can be used. Titanium as metal can also be used, but a titanium compound obtained by combining it with another element is preferred. As the titanium compound, a titanium oxide or a compound relevant to it is preferred. Preferred titanium compounds are $NaTi_6O_{13}$ and $Rb_2Ti_6O_{13}$, though not especially limited to them.

As the titanium oxide, spherical or lumpy titanium oxide particles are generally used as a colorant. In the invention, the warping-reducing effect of the titanium oxide is used for reducing the warping of the molded article.

As the particle shape of the filler contained in the molded article, needles, lumps or flakes can be used. Among them, needles are preferred, and it is preferred that the fiber length is 1 to 500 μm. A filler having a fiber length of 5 to 100 μm is more preferred, and a further more preferred range is 10 to 20 μm.

The needle-like filler contained in the molded article can be pre-compounded in the resin or a flaky filler can also be blended in the pellets.

It is preferred that the filter content of the molded article is 0 to 40 wt %. In the case of a needle-like filler, considering the influence on moldability, etc., it is preferred that the content is 1 to 25 wt %, and a more preferred range is 5 to 20 wt %.

It is preferred that the aspect ratio (fiber length/fiber diameter) of the needle-like filler is 3 to 500, and a more preferred range is 5 to 400. A further more preferred range is 10 to 200.

The needle-like filler can be treated on the surfaces of the needles with any of various treatments. For example, a needle-like filler covered with carbon or tin oxide by means of chemical vapor deposition (CVD) can be used. To impart electric conductivity, a needle-like filler covered on the surfaces of the needles with any of various metals such as silver, nickel and copper by means of CVD or plating-can be used.

To improve the adhesiveness to the polyamide resin, a filler treated on the surfaces of its particles with, for example, a silane coupling agent can be used. Both covering and coupling agent treatment can also be used together.

These materials with various features can be used as required, considering the properties of the FRP molded article of the invention and the characteristics of the process for producing the FRP molded article.

A molded material can be used as it is as a molded article, or the molded material can be finely reground and molded again into a molded article to be used. The reground material can also be a frequently reused one. Into a material not ground at all (virgin material), a certain amount of said ground material can also be added for use.

In this case, it is preferred that the mixing rate of the reground material into the virgin material is 0 to 50 wt %, in view of not extremely lowering the mechanical properties of the molded article. It is especially preferred that the rate is 0 to 40 wt % in view of not extremely lowering the impact resistance, and a range of 0 to 25 wt % is preferred for maintaining the flame retardancy.

Hitherto, it is feared that in the case where a molded article shaped like a polyhedral box has an opening, it may be warped if the material of the molded article is an engineering plastic such as polyamide resin or polycarbonate resin or a material with reinforcing fibers added to the plastic, since there is no facial form for keeping the stiffness.

However, in the FRP molded article of the invention, since a fine filler, especially preferably a needle-like filler is used, local molding shrinkage and irregular stiffness can be inhibited, and as a result, even if the housing obtained as the molded article has an opening, the warping of the housing can be kept small.

A preferred FRP molded article of the invention can be produced if pellets for injection molding containing a thermoplastic resin, reinforcing fibers and filler are injection-molded, with such conditions as mold structure, resin molding temperature, injection pressure, holding pressure and mold cooling time in a hot-runner injection molding apparatus adequately selected.

In this case, it is preferred that the average fiber length of the reinforcing fibers is 0.1 to 7 mm, and that the typical wall thickness of the molded article is in a range of 0.2 to 5 mm. Under these conditions, excellent moldability into a thin-walled molded article can be exhibited.

If the average length of the fibers in the molded article is less than 0.1 mm, the mechanical properties (such as bending modulus of elasticity and tensile strength) of the molded article decline. If the molded article is required to have high stiffness, fibers having a longer average fiber length are more advantageous. It is preferred that the average fiber length in this case is 0.2 mm or more. More preferred is 0.3 mm or more.

On the other hand, if the average length of fibers in the molded article is more than 7 mm, it is feared that the fibers are irregularly dispersed to exist in the molded article, though a large reinforcing fiber effect can be expected. The irregular dispersion of fibers results in molded articles irregular in appearance and mechanical strength, making it difficult to achieve stable production and stable yield.

Therefore, considering the above, it is preferred that the adequate length of fibers in the molded article is 0.1 to 7 mm in view of sustaining stable production and stable yield. In view of sustaining high stiffness and impact resistance, it is more preferred that the length is 0.2 mm to 7 mm, and a further more preferred range is 0.3 mm to 7 mm.

Suitable outside dimensions of the molded article are about 10 to about 5,000 mm in length, about 10 to about 5,000 mm in width and about 0.2 to about 1,000 mm in height.

Preferred is an injection-molded resin article having outside dimensions of about 10 to about 500 mm in length, about 100 to 1,000 in width and about 0.2 to about 100 mm in height, and having at least one rib having a height of about 1 to 100 mm, a width of about 0.1 to about 5 mm and a length of about 1 to about 1,000 mm, or having at least one boss having a height of about 1 to about 100 mm and an outer diameter of about 1 to about 50 mm., More preferred is an injection-molded resin article having outside dimensions of about 50 to 300 mm in length (more preferred is about 100 to about 300 mm in length), about 100 to about 400 mm in width and about 0.2 to about 50 mm in height, and having at least one rib having a height of about 1 to about 50 mm, a width of about 0.1 to about 5 mm and a length of about 1 to 400 mm, or having at least one boss having a height of about 1 to about 50 mm and an outer diameter of about 1 to about 50 mm.

In the case where it is difficult to arrange reinforcing fibers in the small spaces of a thin-walled molded article having a rib or boss when the reinforcing fibers are long, a fine filler, especially preferably a needle-like filler can be used to fill the small spaces and to inhibit local molding shrinkage and irregular stiffness, and as a result, the molded article produced can be less warped and has high mechanical strength.

It is preferred that the bending modulus of elasticity of the molded article is 500 to 4,000 kgf/mm$^2$, and that the volume resistivity of the molded article is 0.001 to 0.01 Ω·m.

The molded article can be produced if thermoplastic resin pellets containing 5 to 50 wt % of reinforcing fibers having an average fiber length of 0.1 mm or more and 0.01 to 30 wt % of a needle-like filler selected from wollastonite, sepiolite, potassium titanate, xonotlite, phosphate fibers, dawsonite, gypsum fibers, MOS, aluminum borate, needle-like calcium carbonate, tetrapod type zinc oxide, silicon carbide, silicon nitride, vapor phase epitaxial carbon fibers, magnesium hydroxide, aluminum hydroxides, basic magnesium sulfate and their combinations are supplied into a hot-runner injection molding apparatus.

In this case, it is preferred that the aspect ratio of the needle-like filler is 3 to 500.

The molded article can also be covered on the surface with carbon or treated on the surface with a silane coupling agent.

In the invention, a housing refers to a container for containing an article, or a shell structure portion covering the functional elements of an article, or a whole of an article including the inside. Examples of the article include precision electronic apparatuses and devices such as a personal computer, desk-top calculator, controller, electronic measuring instrument, communication device, printer and image scanner, portable electronic devices, portable cellular phone and large plasma display panel (PDP) and chassis. The housing preferably used is rectangular. It can be preferably used as a housing of a personal computer, especially notebook type personal computer.

It is preferred that the housing as the FRP molded article of the invention is a polyhedral box in visual shape. The polyhedron is typically a rectangle, though not limited to it. The polyhedron can also be a non-rectangle, for example, having a non-right-angled portion as the angle formed between sides, or a trapezoid or parallelogram. It is not necessary that all the faces are flat, and at least one face may be curved (convex or concave).

The form of the opening or the rate of the opening in the housing can be selected variously depending on the desired housing shape, but for inserting contents into the housing, it is preferred that an opening is formed at least in one face of the polyhedron. Typically it is preferred that one face as a whole is substantially entirely open. In addition to the opening, one or more openings smaller than it can exist in another face or other faces.

The FRP molded article of the invention can have electric conductivity, or can have a decorative effect, or can have a protective layer formed on the surface. In this case, the molded article is covered with a plating material or coating material.

The materials that can be plated on the surface include Au, Ag, Cu, Cr, Pt, Ni, Ti, Ge, Sn, Mo, Ta, W, Al, Nb, Pd, ITM, Inconel, Ni—Cr, 426 gold, Permalloy, SiO, SiO$_2$, Cr$_2$O$_3$, Al$_2$O$_3$, SnO, SnO$_2$, ZrO$_2$, TiO$_2$, Ta$_2$O$_5$, BaTiO$_3$, Fe$_2$O$_3$, Y$_2$O$_3$, CaF$_2$, LiF, MgF$_2$, NbF$_3$, Si$_3$N$_4$, 7059 TiN, Sn—Sb, Si, Al+Si, SUS 304, etc.

The coating on the surface is selected depending on the color, look and taste required for the product. The molded article can be coated simply to have a decorative effect, and also coated with an electrically conductive coating material, to be improved in electric conductivity.

The hot-runner injection molding apparatus used for producing the FRP molded article of the invention is described below.

In FIG. 1, a hot-runner injection molding apparatus 1 is composed of a molten resin extruder 3 installed on a base 1c, a fixed body 1b attached to the tip of the molten resin extruder 3, a movable body 1a installed on the base 1c, to oppose the fixed body 1b accessibly to and leavably from the fixed body 1b, a fixed side plate 4 attached to the fixed body 1b, a movable side plate 5 attached to the movable body 1a, and a mold 2 supported by the fixed side plate 4 and the movable side plate 5 and positioned between them. The mechanism for moving the movable body 1a is not illustrated.

Figure 2:
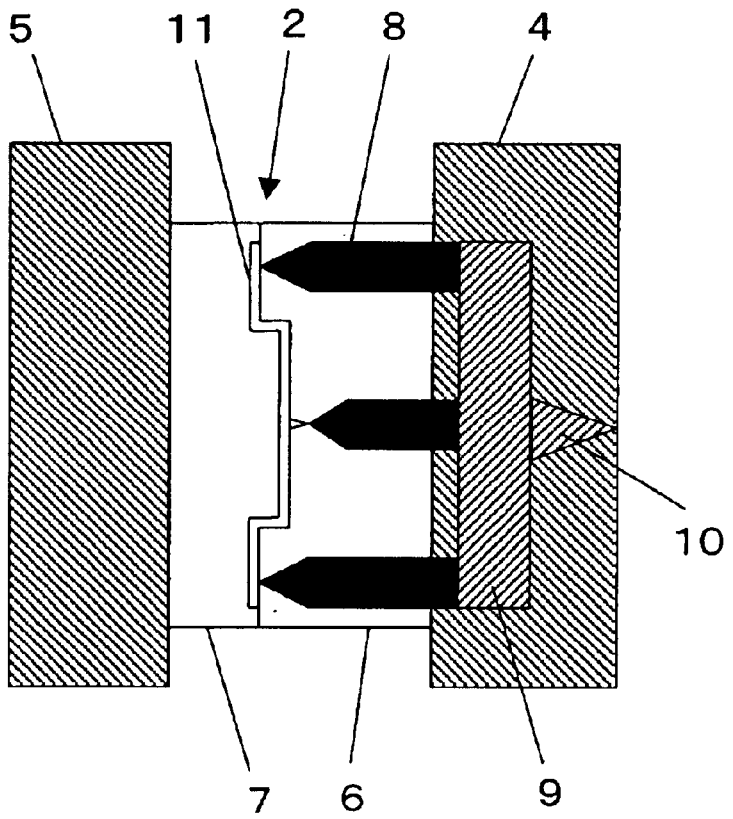
FIG. 2 is a typical vertical sectional view of a mold section of the apparatus shown in FIG. 1.

FIG. 2 shows the detail of the fixed side plate 4, the mold 2 and the movable side plate 5 of the hot-runner injection molding apparatus 1 shown in FIG. 1. In FIG. 2, the cavity 6 of the mold 2 is attached to the fixed side plate 4 and the core 7 of the mold 2 is attached to the movable side plate 5. When the opposite faces of the cavity 6 and the core 7 contact each other, a mold hollow section 11 is formed.

Inside the fixed side plate 4 and the cavity 6, provided are a first sprue 10 for receiving the stream of the molten resin fed from the molten resin extruder 3, a hot-runner manifold 9 for receiving the stream of the molten resin fed from the first sprue 10, and plural hot-runner sprues 8 for receiving the respective streams of the molten resin branching and fed from the hot-runner manifold 9.

At the ends downstream of the respective hot-runner sprues 8, gate portions (not illustrated) are provided, and when the gate portions are opened, the respective hot-runner sprues 8 inject the molten resin from the gate portions into the mold hollow section 11.

The first sprue 10, the hot-runner manifold 9 and the hot-runner sprues 8 keep the resin always molten at a high temperature, unlike the case of cold-runner injection molding. For this purpose, the first sprue 10, the hot-runner manifold 9 and the hot-runner sprues 8 are provided with an electric heater respectively. Also at the tip portions of the hot-runner sprues 8, an electric heater is provided respectively. These means keep the resin always molten.

Figure 37:
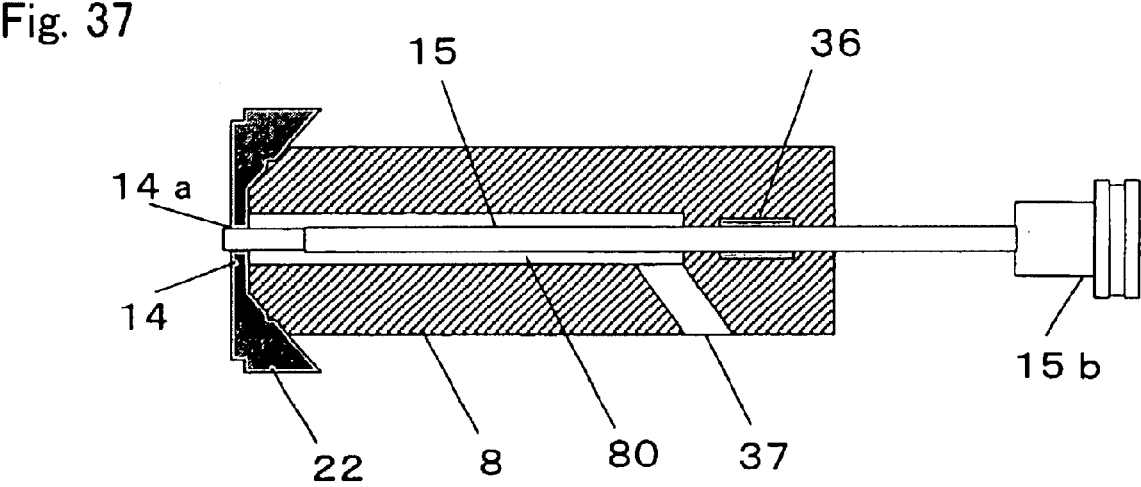
FIG. 37 is a vertical sectional view of an example of the valve pin, guide and gate bush in one of the hot runners used for producing a molded article of the invention.

FIG. 37 shows an example of the hot-runner sprue 8. In FIG. 37, the hot-runner sprue 8 has a hollow section 80 for allowing the resin to flow in it, and a molten resin passage 37 communicating to the molten resin passage of the hot-runner manifold 9 and to the hollow section 80. The tip of the hollow section 80 is opened at the tip of the hot-runner sprue 8. Covering the opening at the tip, a sprue bush 22 is installed at the tip of the hot-runner sprue 8, to form a gate portion 14. The sprue bush 22 has a gate hole 14a formed. The hot-runner sprue 8 has a gate pin 15 inserted into the hollow section 80 from outside and reaching the gate hole 14a. The gate pin 15 is supported by means of a guide 36 movably in the axial direction. At the end of the gate pin 15 on the side opposite to the tip portion, a gate pin drive means 15b is provided. The tip portion of the gate pin 15 and the gate hole 14a constitute a gate. When the tip portion of the gate pin 15 opens and closes the gate hole 14a, the molten resin is injected and the injection is stopped.

Figure 3:
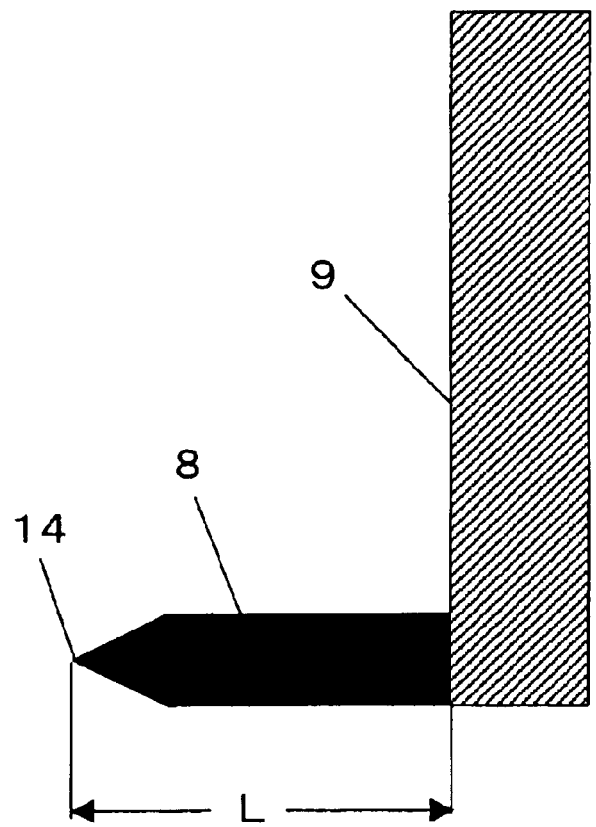
FIG. 3 is a typical side view of a hot-runner sprue installed in the mold section shown in FIG. 2.

FIG. 3 shows the hot runner sprue 8 and the hot-runner manifold 9. As shown in FIG. 3, the length of the hot runner sprue 8 is defined as the length L from the downstream end of the hot-runner manifold 9 to the downstream end of the gate portion 14 of the hot-runner sprue 8.

The length L of the hot-runner sprue 8 is selected depending on the shape of the article to be molded and the size of the mold used for molding. When the FRP molded article of the invention is produced, it is preferred that the length L of the hot-runner sprue 8 is 10 to 600 mm. A more preferred range is 100 to 450 mm.

If the length L of the hot-runner sprue 8 is too short, the distance between the manifold 9 and the tip portion of the hot-runner sprue 8 becomes too small, and the space where an external heat source of the hot-runner sprue 8 is disposed becomes small, making it difficult to adequately heat the hot-runner sprue 8.

If the length L of the hot-runner sprue 8 is too long, the length of the gate pin 15 for valve gate control for opening and closing the gate of the hot-runner sprue 8 becomes too long, making it difficult to control the movement of the gate pin 15. Furthermore, the friction between the gate hole 14a and the gate pin 15 at the tip portion of the gate portion 14 becomes large, and the gate pin 15 or the gate hole 14a is likely to be worn.

Figure 4:
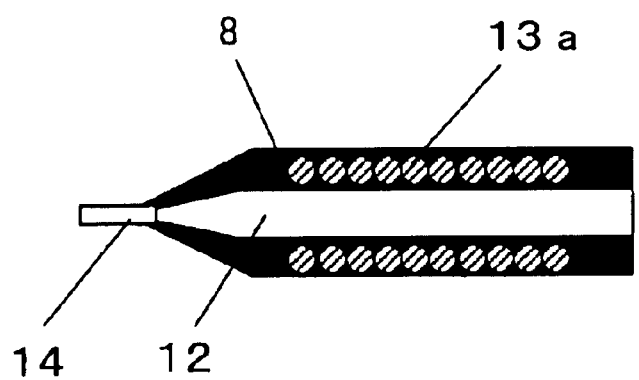
FIG. 4 is a typical vertical sectional view of the hot-runner sprue shown in FIG. 3.

FIG. 4 is a vertical sectional view of the hot-runner sprue 8. The hot-runner sprue 8 has a resin passage 12 formed inside by the hollow section 80, and has the gate portion 14 at the tip portion. It is preferred that the diameter of the gate hole 14a of the gate portion 14 is 0.1 to 10 mm for producing the molded article of the invention. A more preferred range is 1 to 5 mm.

If the diameter of the gate hole 14a is too large, the reinforcing fibers are insufficiently dispersed into the resin, causing the obtained molded article to be poor in appearance. If the hole of the gate hole 14a is too small, the resin cannot be sufficiently kept flowing, and flow defects such as short shots occur.

The hot-runner sprue 8 can be heated externally as shown in FIG. 4 or internally. Both the heating methods have an advantage and a disadvantage respectively. In the production of the FRP molded article of the invention, since reinforcing fibers are used together with a thermoplastic resin, it is preferred to heat the hot-runner sprue 8 externally.

When the hot-runner sprue 8 is heated internally, a heating source is installed inside the hot-runner sprue. So, it cannot be ensured that all the resin in the hot-runner sprue is kept molten, and it becomes difficult to keep the runner passage diameter (flow rate of resin) always substantially constant. Especially in the case where carbon fibers are used as the reinforcing fibers, since the heat conduction of carbon fibers is very good, the resin in contact with the lateral face of the hot-runner sprue is solidified, making it difficult to ensure the desired runner passage diameter (flow rate of resin). If it becomes difficult to ensure the desired runner passage diameter (flow rate of resin), it becomes difficult to keep the resin flow balanced, and the obtained molded article is likely to be warped or has poor appearance.

The hot-runner sprue 8 to be externally heated has an electric wire heater 13a (FIG. 4) as a heat source outside the hot-runner sprue 8. The resin in the resin passage 12 in the hot-runner sprue 8 is perfectly kept molten.

It is preferred that a heater (not illustrated) for local heating is disposed at the gate portion 14 of the hot-runner sprue 8. Since the gate portion 14 of the hot-runner sprue 8 is always kept in contact with outside air and the mold 2, the temperature of the resin positioned at the gate portion 14 is likely to decline, and as the case may be, it can happen that the resin is solidified at the gate portion 14, not allowing injection molding. This problem can be avoided if a heater for local heating is disposed at the gate portion 14.

Figure 5A:
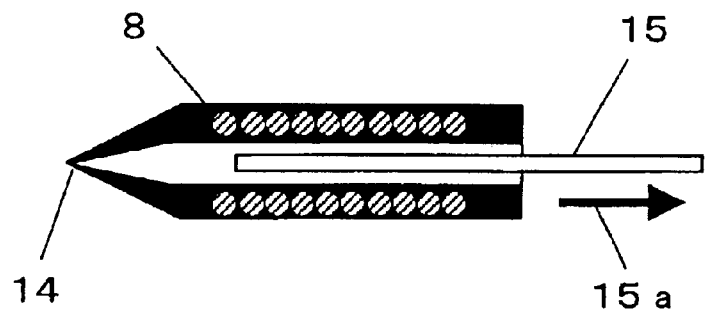
FIGS. 5A and 5B are typical vertical sectional views for explaining opening and closing of a valve gate of a hot-runner sprue.
Figure 5B:
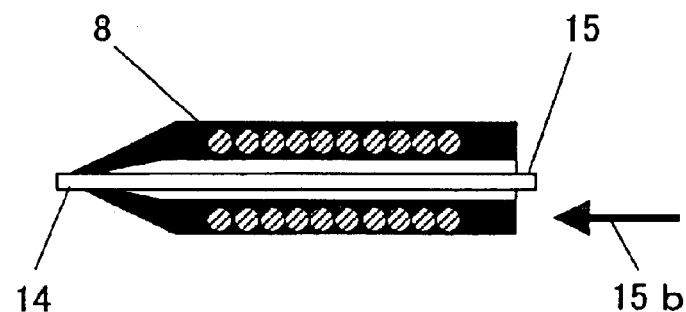

In reference to FIGS. 5A and 5B, the actions of opening and closing the gate portion 14 of the hot-runner sprue 8 are described below. It is preferred that the gate portion 14 of the hot-runner sprue 8 in the hot-runner injection molding apparatus for producing the FRP molded article of the invention is controlled using a valve.

The method of controlling a gate using a valve is called a valve gate method. In this method, when the resin is injected, the gate pin 15 recedes from inside the gate portion 14 as indicated by arrow 15a, to open the gate portion 14. As a result, the resin passage at the gate portion 14 is opened, allowing the resin to be injected into the mold hollow section 11. After the resin has sufficiently filled the mold hollow section 11, the gate pin 15 advances as indicated by arrow 15b, to close the gate portion 14. As a result, the resin passage at the gate portion 14 is closed to stop the injection of the resin into the mold hollow section 11.

That is, the gate pin 15 controls the injection of the resin and the stop of the injection. In the case where there is only one hot-runner sprue 8, only one gate pin 15 control system is needed.

On the other hand, in the production of the molded article of the, invention, there arise a case where several hot-runner sprues 8 become necessary, though depending on the size of the molded article. For example, when the housing of an office machine or device, especially of an A4 size (width 210 mm, length 297 mm) notebook type personal computer is produced using a hot-runner injection molding apparatus, 1 to 26 gates can be used. However, it is preferred that the number of gates is 4 to 17.

If the number of gates is too small, the resin cannot be sufficiently kept flowing, and short shots occur, not allowing desired molded articles to be obtained. If the number of gates is too large, it becomes difficult to dispose hot-runner sprues as many as the gates.

In the case where many hot-runner sprues are used for producing one molded article, it is preferred to control the opening and closing of the gates for the respective hot-runner sprues independently. This control method allows the quantities of the resin flowing into the mold from the respective gates to be equal to each other. If the quantities of the resin flowing into the mold from the respective gates are kept equal to each other, the warping peculiar to the molded article obtained from a thermoplastic resin containing reinforcing fibers can be kept small.

It is preferred that the movement of the gate pin 15 is controlled by means of fluid pressure, more specifically oil pressure, air pressure or water pressure. Among them, oil pressure or air pressure is more preferred.

The valve control method is excellent in the fine adjustment of gate opening and closing times and resin flow rate because of its characteristics, and the balance of injection flow rates can be easily controlled. As a result, a molded article substantially free from warping and excellent in appearance can be obtained.

In the case where a long fiber-reinforced resin is injection-molded using the cold-runner injection molding method, the reinforcing fibers are separated from the resin at the gates where the resin flows into the cavity of the mold from the sprues, and the fiber density at the gates becomes high. So, when the mold is opened, a phenomenon that the portions of the molded article positioned at the gates are torn off is likely to occur.

This phenomenon relates to the shape of the gates (especially the diameter of the gate holes), and in the case of a resin containing long fibers, if the gate hole diameter is larger, the phenomenon occurrence frequency becomes higher. To prevent the tearing off at the gates, the mold shape is designed to avoid that the gates are not disposed directly on the surface of the molded article, and the obtained molded article must be additionally processed at the portions corresponding to the gates. This raises the cost.

If a hot-runner system of valve gate method is used for producing the molded article of the invention, the gates can be reliably closed by means of the valve pins disposed in the hot-runner sprues, and even if the gates are disposed directly on the surface of the molded article, the phenomenon of tearing off at the gates does not substantially occur.

Figure 30A:
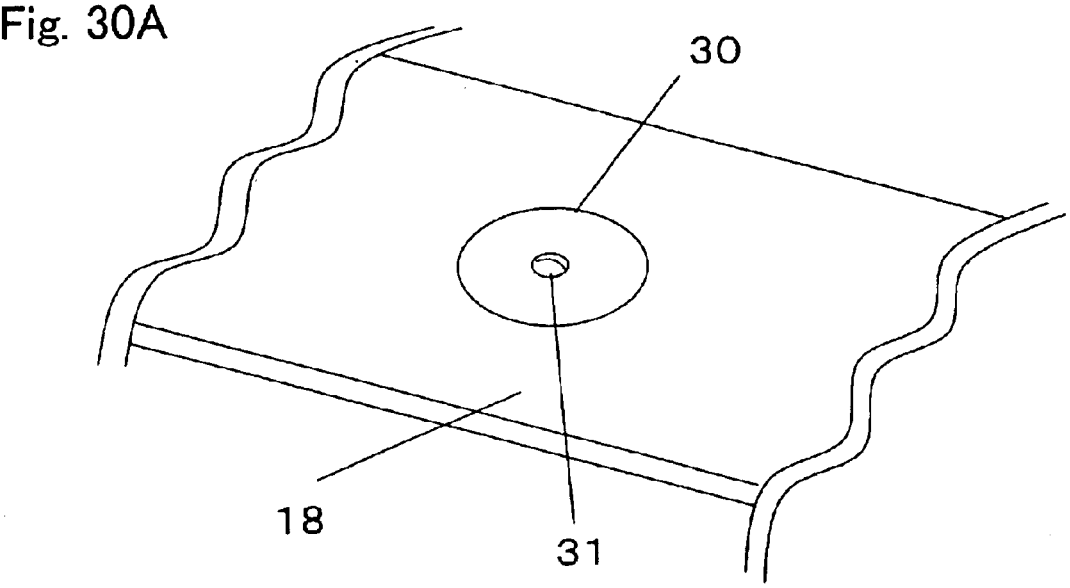
FIG. 30A is a perspective view of an example of a depression portion formed by a hot-runner gate portion on a surface of a molded article of the invention.
Figure 30B:
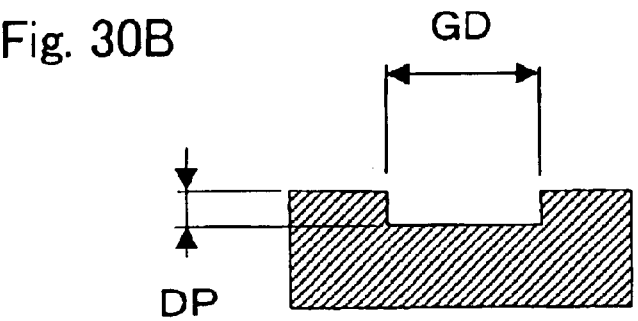
FIG. 30B is a vertical sectional view of the depression portion shown in FIG. 30A.

In this case, pin marks are formed on the molded article as depressions at the positions corresponding to the gates. An example of the depression is shown in FIGS. 30A and 30B. The depressed pin mark 31 has a depth (DP) of 0.05 to 0.3 mm and a diameter (GD) equal to the hole diameter of the gate used.

The hot-runner manifold 9 is heated by means of an external heater (not illustrated) like the hot-runner sprues 8, to keep the resin molten.

The outside shape of the hot-runner manifold 9 is depicted as a box in FIG. 2, but the manifold has a heater inside for heating the resin and has resin passages (runners) formed inside.

The outside shape of the hot-runner manifold 9 depends on the size of the mold 2 used and the number of the hot-runner sprues 8. For example, in the case where the housing of an office machine or device, especially an A4 size notebook type personal computer is molded using a hot-runner injection molding apparatus, it is preferred that the outside shape of the housing is a box having a length of about 100 to about 600 mm, a width of about 100 to about 600 mm and a height of about 10 to about 600 mm. It is more preferred that the box has a length of about 200 to about 500 mm, a width of about 100 to about 500 mm and a height of about 10 to about 500 mm. It is further more preferred that the box has a length of about 200 to about 400, a width of about 100 to about 300 mm and a height of about 10 to about 400 mm.

It is preferred that the resin passages in the hot-runner manifold 9 have an inner diameter of 1 to 30 mm. A more preferred range is 2 to 20 mm, and a further more preferred range is 2 to 15 mm.

The hot-runner manifold 9 generally has a horizontally splittable structure or an integral structure. In the case of horizontally splittable structure, the top and bottom members respectively having runner halves are joined, for example, by means of welding, adhesive, bolting, pinning, fitting or vibration fusion. The runners in the integral structure can be formed by way of drilling holes from a lateral face.

In the hot-runner injection molding apparatus for producing the FRP molded article of the invention, the resin passage distances from the inlet at which the resin flows from the molten resin extrusion molding machine 3 into the hot-runner manifold 9 (first sprue 10) to the gate portions 14 of the hot-runner sprues 8 opened to the mold hollow section 11 of the mold 2 are as described below.

In the case where the FRP molded article of the invention is produced with plural hot-runner gates, it is preferred that the distances to the respective gates are substantially equal to each other. The distance to each gate is not a straight-line distance, but a distance during which the resin flows.

That distances are substantially equal to each other means that it is preferred that the value of SL/SS is 3 or less, where SL is the longest distance to a gate and SS is the shortest distance to a gate. More preferred is 2 or less, and further more preferred is 1.5 or less.

On the other hand, in the case where the distances cannot be made substantially equal to each other as described above due to the mold structure, the same effect can be achieved if the opening and closing timings of respective hot-runner gates are made different. Making the opening and closing timings different means that the respective gates are opened and closed at different times.

The state achieved in this way, in which the distances to the respective gates are substantially equal to each other, is very effective for decreasing the warping of the obtained molded article.

The article obtained by injection-molding a fiber-reinforced resin has anisotropy in the molded article as a whole due to the oriented reinforcing fibers, irrespectively of whether the resin constituting most of the material is a crystalline resin or an amorphous resin. The molded article obtained by injection molding shrinks while it is cooled from the state where it is discharged from the mold (high temperature), to room temperature. The shrinkage depends on the reinforcing fibers used and the orientations. In the case where a thermoplastic resin containing reinforcing fibers is used, if the fibers appear to be uniformly oriented in the molded article, the warping of the molded article can be greatly decreased.

In the case where a thermoplastic resin containing reinforcing fibers is used, if the resin passage distances from the first sprue to the respective gates are equal to each other, there is an effect that the warping of the obtained molded article can be kept small.

In the case where a fiber-reinforced resin is used, the reinforcing fibers are oriented radially from the gate concerned. In the case where plural gates are used, the reinforcing fibers are oriented radially from the respective gates. The state of the radially oriented reinforcing fibers decides the warping in the obtained molded article. If the quantities of the resin inflow from the respective gate portions are not equal to each other, the balance among the quantities of resin inflow at the portions of the molded article corresponding to the respective gates is lost to increase the warping.

In the case where plural gates are used, if the distances to the respective gates are equal to each other, the quantities of resin inflow into the portions of the molded article corresponding to the respective gates become substantially equal to each other. So, the warping of the obtained molded article can be decreased, and furthermore, the resin pressure distribution occurring during injection molding becomes uniform.

Figure 26:
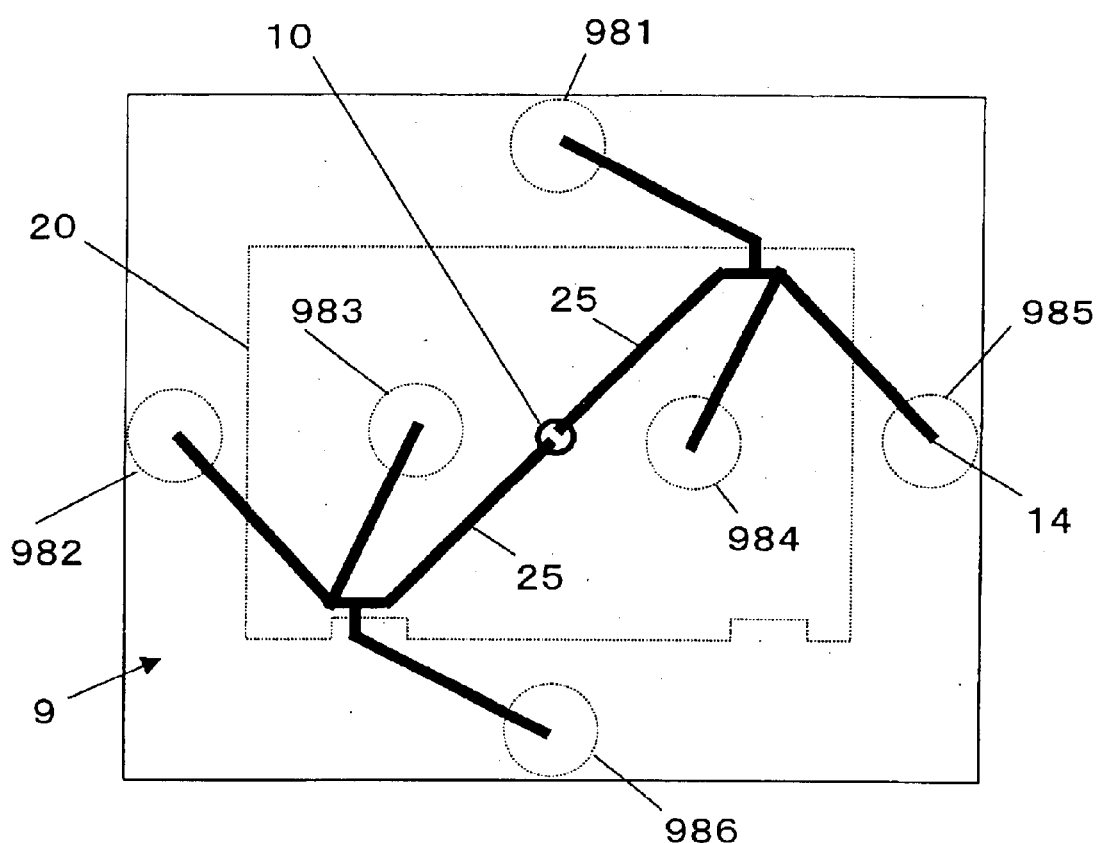
FIG. 26 is a typical plan view for illustrating the resin passages in the hot-runner manifold used in Example 9.

For example, as shown in FIG. 26, for the gate portions 14 relatively close to the first sprue 10 in straight-line distance, the resin passages 25 are formed as detours to ensure that the distances to the respective gate portions 14 become substantially equal to each other.

In the case where the FRP molded article of the invention has a rectangular flat face of about A4 size, the hot-runner sprues 8 can be arranged to be vertically and horizontally symmetrical when viewed from the first sprue 10 side (when projected from the first sprue 10 side), or can also be vertically (in the short side direction) asymmetrical or non-radial. If they are arranged to be horizontally (in the long side direction) asymmetrical, the balance among resin flow rates during molding is adversely affected, and the molded article will be greatly warped.

In a thin-walled molded article having a vertical wall on a lateral face, even if the distances to the respective gates are substantially equal to each other, or even if the distances to the respective gates are geometrically equal to each other, it can happen that the molded article is greatly warped. The reason is that if the thickness of the top wall is thinner, the molded article is more affected by the vertical wall. In other words, the stiffness of the top wall becomes lower than that of the vertical wall, and the molded article is likely to be affected by the orientations of reinforcing fibers. This problem that occurs also when the positions of weld lines are moved is described below in reference to an example.

In the case where plural gates are used for molding, the resin masses flowing into the cavity in respectively different directions collide with each other on the surface of the molded article, and weld lines are formed. The weld lines become an appearance defect of the molded article, depending on the coating employed.

In the production of the FRP molded article of the invention, the arrangement of the hot-runner sprues 8 is changed to move the positions of weld lines, or one gate is used for molding to avoid the formation of any weld line. In this case, since it can happen the molded article is greatly warped, sufficient care must be exercised for gate arrangement. In the case where the use of one gate only is not possible and where it is difficult to move the positions of weld lines, or in the case there arises a coating problem even if the positions of weld lines can be moved, it is necessary to arrange the gates not to be equal in distance on purpose or to set the valve opening and closing timings to ensure that the distances to the respective gates do not become equal to each other on purpose.

Figure 31:
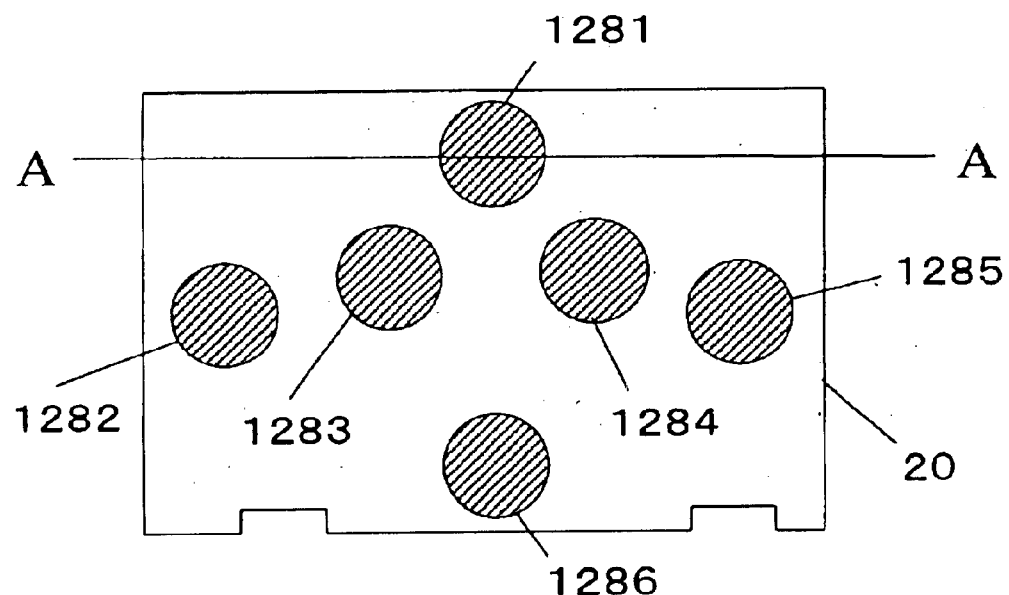
FIG. 31 is an illustration of the gate layout used in Example 12. The top drawing is a plan view of the gate layout and the bottom drawing is a vertical sectional view of it at the A—A position shown in the plan view.
Figure 31:
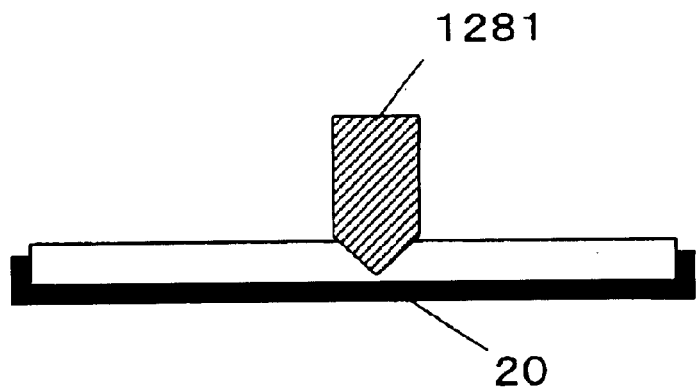
Figure 32A:
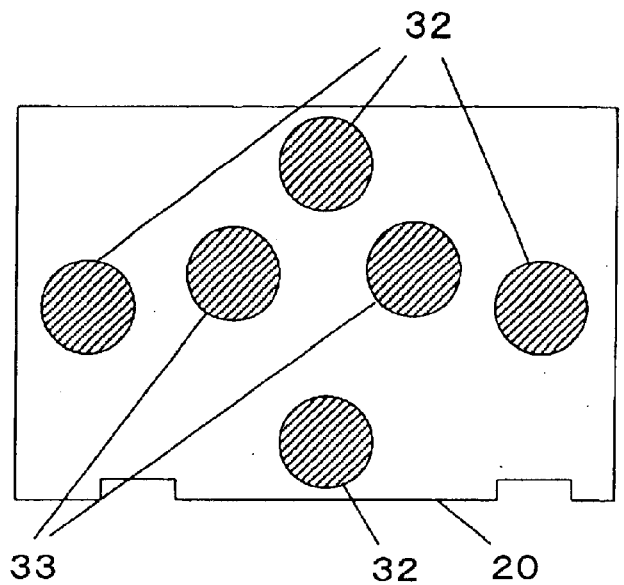
FIGS. 32A, 32B and 32C are plan views for illustrating opening and closing timings of the respective gates of hot runners used for producing a molded article of the invention.
Figure 32B:
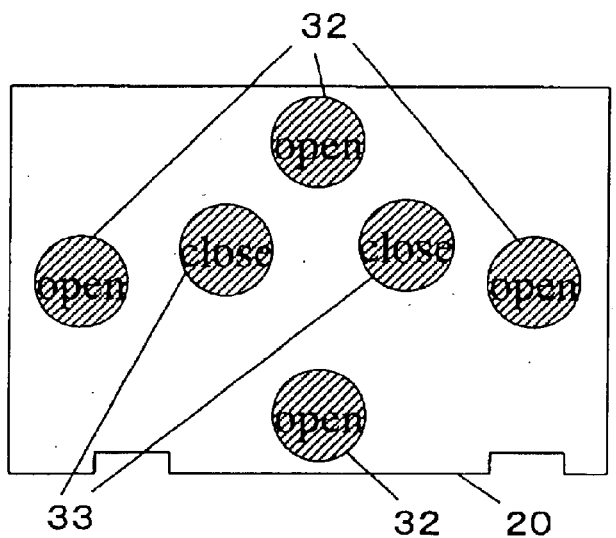
Figure 32C:
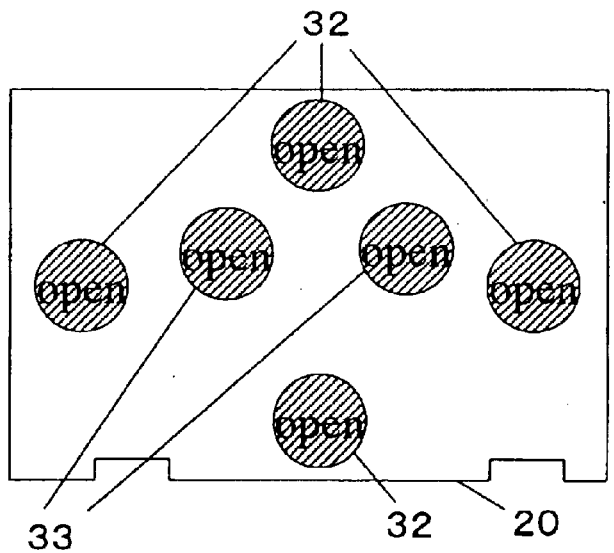

In the case of an LCD cover of the housing for an A4 size notebook type personal computer, in the gate layout shown in FIG. 31, as shown in FIGS. 32A, 32B and 32C, if the gates 33 located in the central portion (two gates are shown in the drawings) are opened to let the resin flow in from the gates 33 in the central portion about 0.1 to 2 seconds after the resin has flowed in from the gates 32 located in the peripheral portion (four gates are shown in the drawings), a molded article substantially not warped can be obtained.

As required, the gates 33 in the central portion opened later can also be closed earlier than the gates 32 in the peripheral portion. What gates are selected for opening at a delayed timing and what time is set for delayed opening can be decided variously depending on the shape of the molded article, mold structure and hot-runner manifold structure. In the case of an LCD cover of the housing for an A4 size notebook type personal computer, if the gates located in the peripheral portion are opened earlier and if the gates located in the central portion are opened a predetermined time later and closed, a desired molded article can be obtained effectively.

If the gates are arranged not to be equal to each other in distance on purpose or if the valve opening and closing timings are set to ensure that the distances to the respective gates do not become equal to each other, the height of the weld lines can be decreased. Decreasing the height of weld lines means that the weld line height is actually lowered, and that it cannot be observed that the weld lines exist.

An LCD cover, for example, an LCD cover of the housing for an A4 size notebook type personal computer, contains an LCD panel inside. So, it is a hexahedron and generally the two faces of it have openings. In this case, for fixing the LCD panel on lateral faces of the housing, vertical walls are provided on the lateral faces. The vertical walls of a molded article having the vertical walls on lateral faces, taken out of the mold, tend to incline inwardly due to material shrinkage. It is very difficult to mount an LCD panel on the housing having inwardly inclining vertical walls.

This problem can be solved by a method of correcting the inward inclination of the lateral faces in the step of correcting the form of the molded article after coating. The problem can also be solved by a method of designing a mold having lateral faces inclining outwardly based on the predicted inward inclination of the lateral faces of the LCD cover.

Figure 33A:
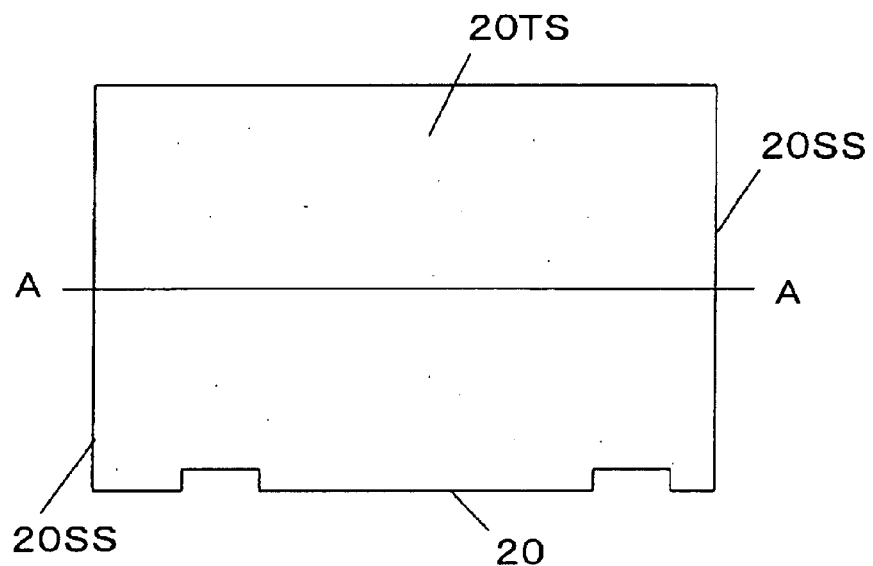
FIG. 33A is a plan view of an example of a molded article shape (mold design) for preventing an inward inclination of lateral faces of a molded article of the invention.
Figure 33B:
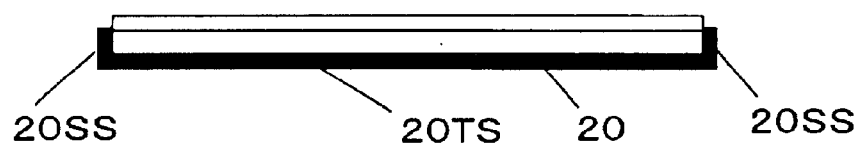
FIG. 33B is a front view of the molded article shape (mold design) shown in FIG. 33A.
Figure 33C:
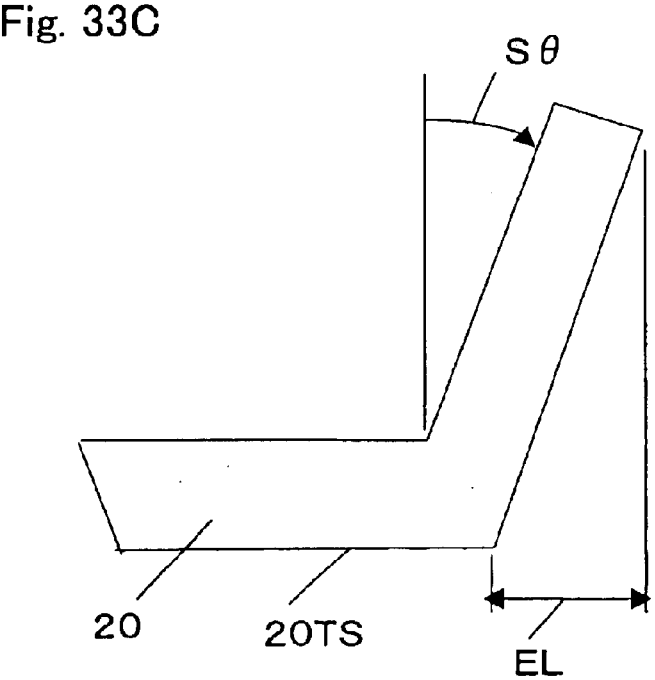
FIG. 33C is a front detail view of an end portion of the molded article shape (mold design) shown in FIG. 33B.

This mode is shown in FIGS. 33A, 33B and 33C. FIG. 33A is a plan view of the rear face of a molded article 20. FIG. 33B is the A—A vertical sectional view of FIG. 33A. FIG. 33C is an expanded vertical sectional view showing a lateral portion of the molded article 20. In these drawings, the molded article 20 has an outer surface 20TS and both lateral faces 20SS.

In the case where a mold having lateral faces 20SS inclined outwardly (at an angle (Sθ)) is designed, it is preferred that the outward inclination (EL) is EL=0.05 to 0.5 mm (Sθ=0.1 to 2.0°) for an A4 size LCD cover (lateral face height 5 mm to 20 mm). A more preferred range is EL=0.1 to 0.3 mm (Sθ=0.3 to 1.2°).

In this mode, it is assumed that the wall thickness of the lateral faces is not changed.

Figure 6A:
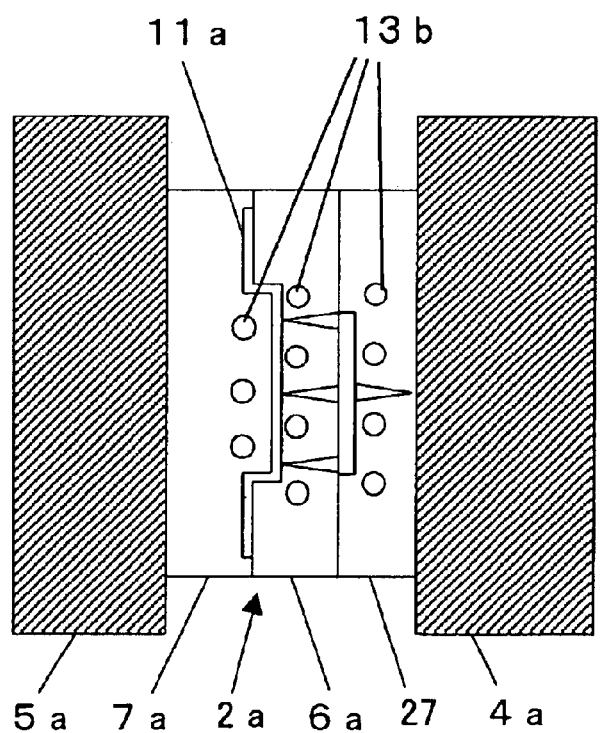
FIG. 6A is a typical vertical sectional view of a mold section of a conventional injection molding apparatus having no hot-runner sprue.
Figure 6B:
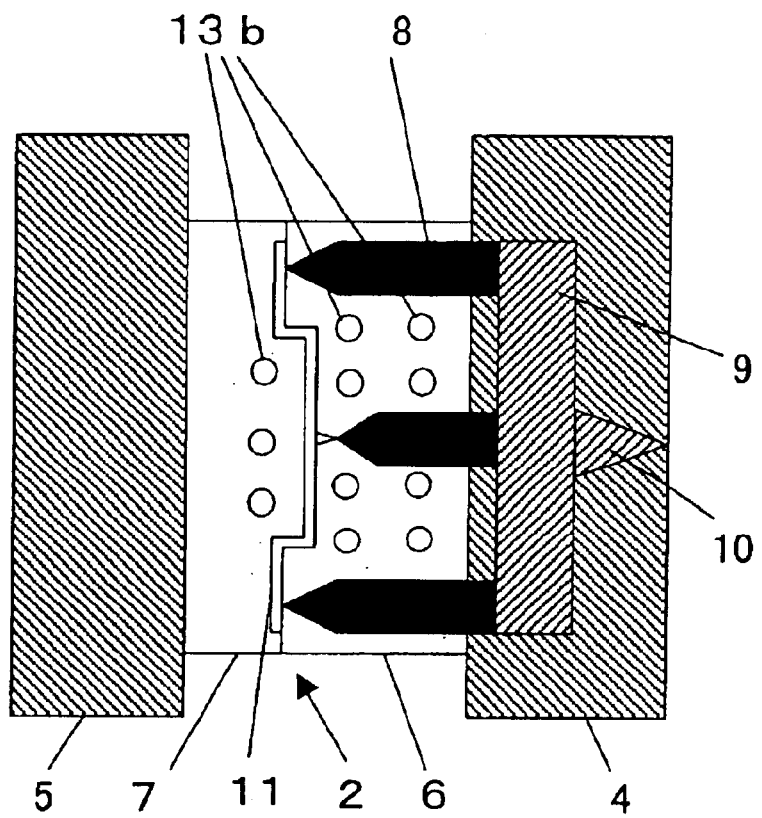
FIG. 6B is a typical vertical sectional view of another example of a mold section of an injection molding apparatus having a hot runner used for producing a molded article of the invention.

In the production of the FRP molded article of the invention, the mold 2 used in the hot-runner injection molding apparatus is structurally different from the generally used mold for resin injection molding, in the following constitution as shown in FIG. 6B.

The generally used mold for resin injection molding is made by machining a lump of a steel material, and as shown in FIG. 6A, it is composed of such parts as a runner 27, a cavity 6a, a core 7a, etc. These parts have cooling water passages 13b formed in them in a structure for cooling the respective parts by cooling water. A mold 2a has a structure capable of molding one to plural molded articles 20a at one time of molding.

For producing the FRP molded article of the invention, in the mold 2 used in the hot-runner injection molding apparatus, the hot-runner manifold 9, the hot-runner sprues 8 and the first sprue 10 must keep the resin in molten state. So, the cavity 6, the core 7 and the sprue bushes have high temperature portions and low temperature portions. The low temperature portions have cooling water passages 13b formed as in the generally used mold for resin injection molding, as a structure to cool the mold 2. On the other hand, the high temperature portions have electric wire heaters 13a (FIG. 7) for heating the respective parts, as a structure to keep the resin always in molten state.

The temperature of the mold as a cooled portion is about 20 to 90° C., but the temperature of the hot-runner manifold 9, the hot-runner sprues 8 and the first sprue 10 as high temperature portions is about 200 to 350° C.

It is preferred that the temperature of the mold in the cooled portions on the surfaces of the cavity 6 and the core 7 corresponding to the surface of the molded article is about 20 to 90° C. A more preferred range is about 30 to 85° C., and a further more preferred range is about 30 to 80° C.

Figure 7:
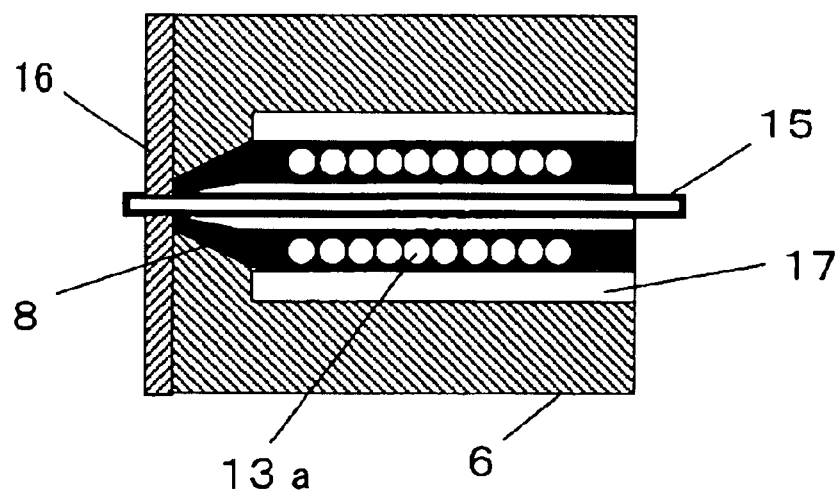
FIG. 7 is a typical vertical sectional detail view of the hot runner in the mold section shown in FIG. 6B.

It is necessary to prevent that the heat of the high temperature portions is transmitted to the low temperature portions, i.e., to insulate heat between those portions. For the portion of the hot-runner manifold 9, as shown in FIG. 7, an air heat insulating layer 17 is formed in the clearance between a low temperature portion and a high temperature portion.

For the portions of the hot-runner sprues 8 and the first sprue 10, a structure having more cooling water passages or having a larger passage diameter compared with the generally used mold for resin injection molding is employed.

To keep the temperature of the surfaces of the cavity 6 and the core 7 corresponding to the surface of the molded article at 20 to 90° C., a coolant fluid circulating mechanism is provided respectively on said surfaces or preferably in the gate bushes 22, or a coolant is brought into contact with the surfaces whenever molding is carried out. As a further other method, a hollow heat insulating structure can be provided respectively inside the surfaces. However, a method, in which a heat insulating plate 16 made of a heat insulating material is provided around the gate portions 14 near the surfaces of the cavity 6 and the core corresponding to the surface of the molded article, can be preferably used.

As the material of the heat insulating plate 16, a material having a large thermal capacity, i.e., a small thermal conductivity can be used. Suitable materials having a small thermal conductivity for the heat insulating plate 16 include ceramics, antimony, iridium, carbon steel, Ni—Cr alloy, silicon steel, stainless steel, nichrome, bismuth and titanium. Considering the strength and rigidity as mold steel, among them, carbon steel, Ni—Cr alloy, stainless steel and titanium are preferred. Carbon steel, stainless steel and titanium are more preferred. Any one of these metals can be used as required, or plural metals can also be used in combination. Any of these metals can also be combined with the mold material used.

Figure 8:
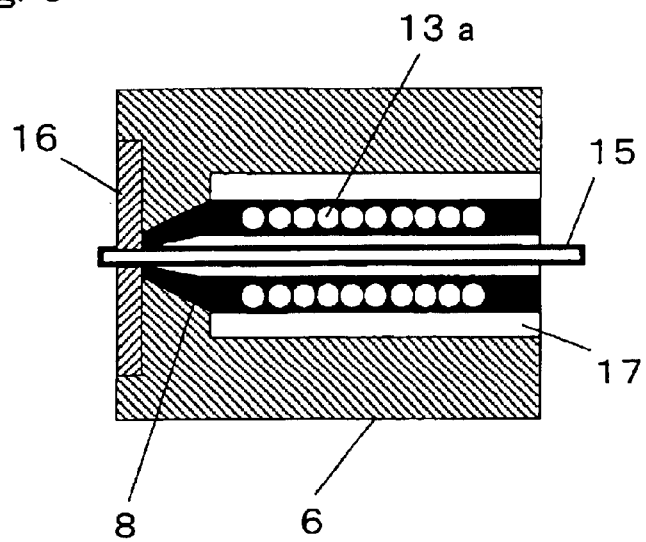
FIG. 8 is a typical vertical sectional detail view of another example of a hot runner different from the hot runner shown in FIG. 7.

The form of the heat insulating plate 16 is not especially limited. A plate having a polygonal or circular lateral side form is suitable, and in view of easy machinability, a circular plate is more preferred. The heat insulating plate 16 can be installed for each gate as shown in FIG. 8, or can be installed for the entire surface of the mold as shown in FIG. 7.

The size of the heat insulating plate 16 can be variously decided depending on the size of the mold 2 and the size of the hot-runner sprues 8. For example, in the case where it is installed for each gate, it is preferred that the sectional area of the heat insulating plate is 4 to 8,000 mm$^2$. A more preferred range is 15 to 5,100 mm$^2$, and a further more preferred range is 50 to 3,000 mm$^2$.

If the heat insulating plate is too large, it is difficult to install the heat insulating plate in view of the mold structure, and if it is too small, the heat insulating effect cannot be expected.

The thickness of the heat insulating plate 16 is decided, considering the molten resin temperature and the thermal effect on the molded article. In the case where the heat insulating plate is installed for each gate, it is preferred that the thickness is 0.1 to 20 mm. A more preferred range is 1 to 15 mm, and a further more preferred range is 1.5 to 10 mm.

If the thickness is too large, the length of the pin 15 must be longer by a length corresponding to the thickness of the heat insulating plate 16, and the length of the straight portion of the gate 14 becomes longer, causing galling between the pin 15 and the gate 14. If the thickness is too small, the heat insulating effect cannot be expected, and the strength becomes insufficient. When the thickness of the heat insulating plate 16 is not uniform, the average value is used as the thickness.

Figure 9:
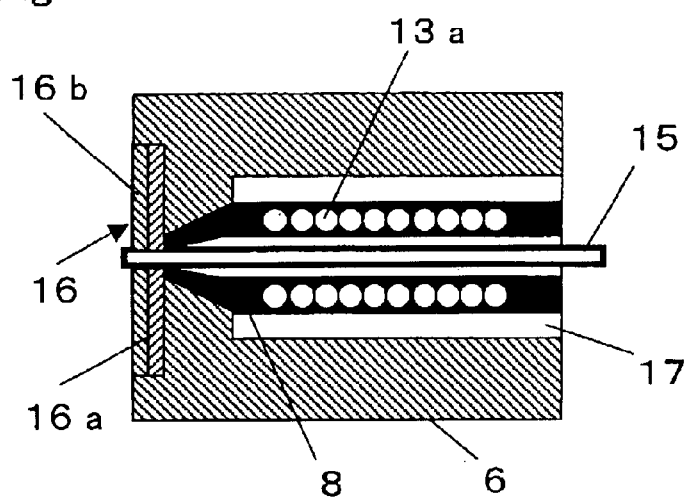
FIG. 9 is a typical vertical sectional detail view of another example of a hot runner different from the hot runner shown in FIG. 7.

The heat insulating plate 16 can be composted of a metallic plate only, or as shown in FIG. 9, it can also be a laminate consisting of a metallic plate 16a and a plate 16b made of another material such as a resin.

The gate portions 14 can be arranged directly on the surface of the molded article, but a heat insulating material 16 can be attached to the tip portion of each gate.

In the case where a heat insulating material 16 cannot be arranged at the tip of each gate because of the mold structure, if the gate portion 14 is directly arranged on the surface of the molded article, it can happen that the molded article becomes defective due to burn, etc., since the tip portion of the gate has a high temperature. In this case, between the gate portion 14 and the surface of the molded article, a certain clearance can also be formed. In this case, the molded article has gate portions remaining, but if they are removed by means of machining, the same appearance as that obtained when the gate portions 14 are arranged directly on the surface of the molded article can be obtained.

The distance between the surface of the mold space and each gate can be decided as required, but it is preferred that the distance is 0 to 50 mm. A more preferred range is 0 to 30 mm, and a further more preferred range is 0 to 10 mm.

If this distance is too long, the possibility of breaking the gate portion increases, and if it is broken, broken pieces remain in the mold after molding, necessitating the suspension of the next molding. Furthermore, if this distance is too long, since this portion is a portion not included in the molded article (portion to be thrown away), the waste increases to raise the cost of the molded article.

The materials that can be used to constitute the mold include carbon steel for machine structure, chrome molybdenum steel, carbon tool steel, alloy tool steel, high carbon bearing steel, aluminum chrome molybdenum steel, etc.

The gate layout is described below. To obtain a less-warped molded article excellent in appearance, the arrangement of the hot-runner sprues 8 is important.

In the case of a housing for an office machine or device typified by a housing for a notebook type personal computer, since the size is relatively large, it is difficult to keep the resin flowable, and it is preferred to arrange the gates on the face of the molded article.

Figure 10:
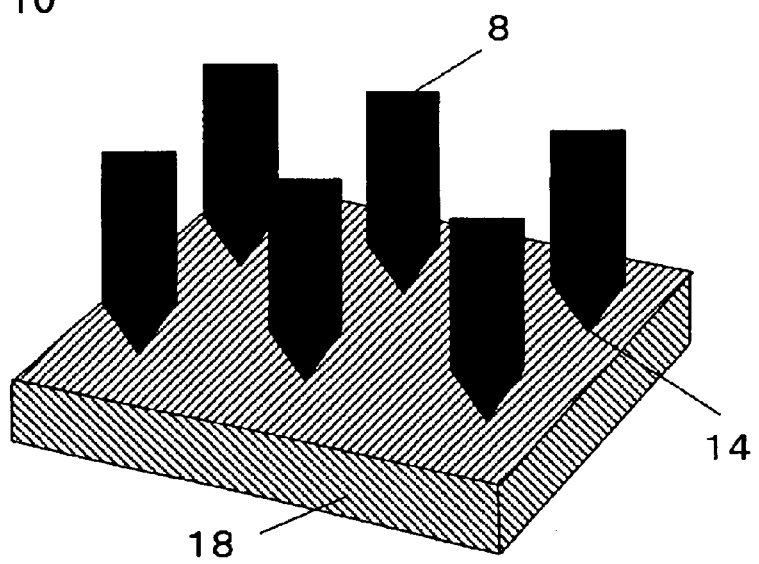
FIG. 10 is a typical perspective view of an example of a gate layout of hot-runner sprues in a mold section of an injection molding apparatus having hot runners used for producing a molded article of the invention.
Figure 11:
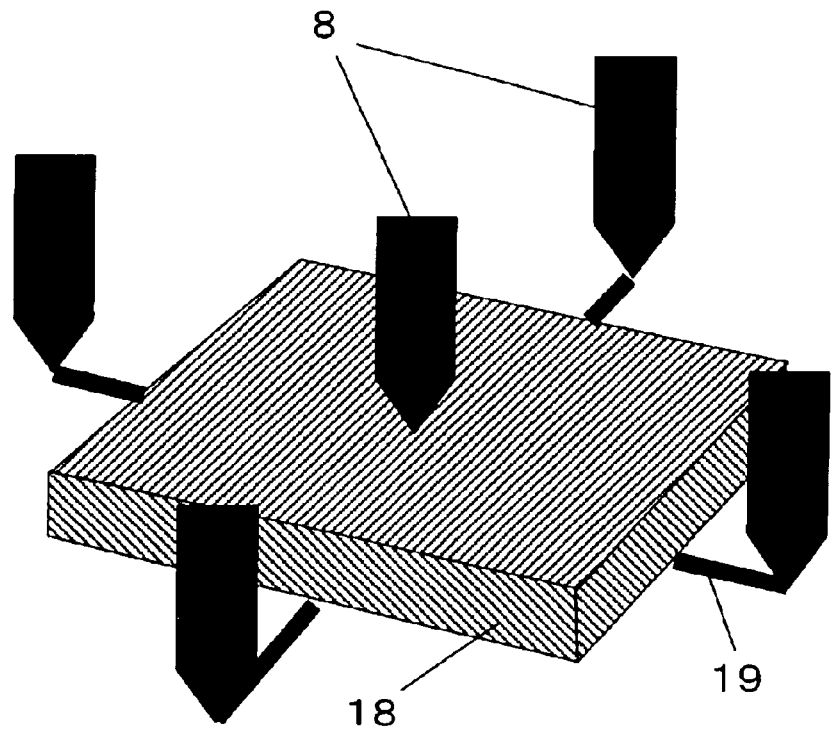
FIG. 11 is a typical perspective view of another example of a gate layout of hot-runner sprues different from the gate layout shown in FIG. 10.
Figure 12:
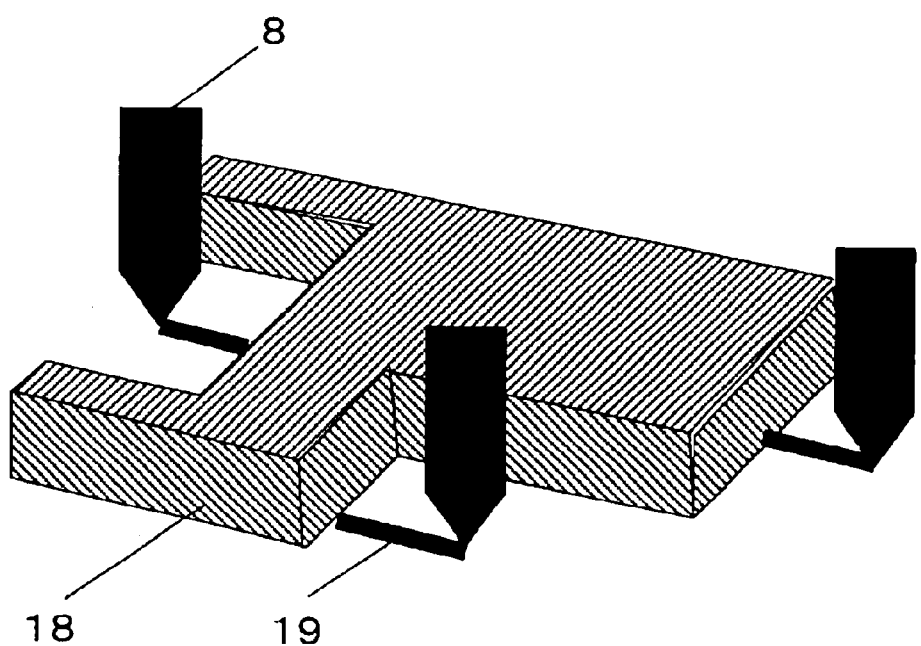
FIG. 12 is a typical perspective view of another example of a gate layout of hot-runner sprues different from the gate layout shown in FIG. 10.

As shown in FIG. 10, all the hot-runner sprues 8 can be arranged on the face of the molded article 18, and as shown in FIG. 11, some hot-runner sprues 8 can be arranged on the face of the molded article 18 while the other hot-runner sprues 8 are arranged at positions outside the face of the molded article 18. In the case of a polygonal molded article having a large cutout portion as shown in FIG. 12, all the hot-runner sprues 8 can be arranged at positions outside the face of the molded article 18.

The mold structure is described below. An ordinary mold for resin injection molding is made by either the front gate method, in which the gates are mainly arranged on the decorative face of the molded article (surface of molded article), or the reverse gate method, in which the gates are not arranged on the decorative face of the molded article.

The mold used for producing the FRP molded article of the invention can be made either by the front gate method or the reverse gate method. Either method can be selected as required in response to the appearance required for the molded article and the shape of the molded article.

For example, in the case where a molded article severe in the appearance standard of the decorative face like the housing for accommodating the LCD panel for a notebook type personal computer is produced, a mold that does not allow the gate form to appear on the decorative face of the molded article is used. That is, in this case, a mold made by the reverse gate method, in which the gates do not oppose the decorative face of the molded article, is used.

For a housing for accommodating, for example, an HDD for a notebook type personal computer or for producing a molded article used as an internal part of an automobile or office machine, etc. which is not required to be coated, the front gate method, in which the gates do not oppose the surface of the molded article, is employed since the appearance standard of the surface of the molded article is not so severe as that for the housing for said LCD panel.

As described before, since the FRP molded article of the invention is produced by means of hot-runner injection molding, the quantity of the sprue runners 19 (FIGS. 11 and 12) removed from the portion destined to be the product and thrown away is decreased. Furthermore, the molding cycle can be shortened.

In cold-runner injection molding, it is necessary to sufficiently cool both the portion destined to be the molded article and the sprue runner portions to be thrown away in the mold. If the sprue runner portions are insufficiently cooled, a phenomenon that relatively thin sprue runner portions remain in the mold when the mold is opened occurs (sprue clogging phenomenon), and as the case may be, continuous molding cannot be made. This phenomenon remarkably occurs in the molding using a long fiber-reinforced resin material small in molding shrinkage compared with the general engineering plastics not containing reinforcing fibers. Therefore, the mold must be designed to suit the molding using a long fiber-reinforced resin material.

Since the FRP molded article of the invention is produced by means of hot-runner injection molding, the sprue runners existing in the conventional cold-runner injection molding do not exist in the mold. Therefore, the sprue clogging phenomenon does not occur.

The average fiber length in the FRP molded article of the invention is a weight average fiber length. The measuring method is as follows.

(i) A test piece having a size of 10 mm long×10 mm wide (thickness is not limited) is cut out of a molded article.

(ii) The test piece is immersed in a solvent for 24 hours, to dissolve the resin component. As the solvent, a solvent capable of dissolving the base resin of the molded article is selected adequately. For example, if the resin is nylon, formic acid can be selected. If the resin is a polycarbonate, dichloromethane or orthochlorophenol can be selected. After the resin portion of the test piece is dissolved, an inorganic substance including reinforcing fibers remains.

(iii) The reinforcing fibers are observed at a 10- to 100-fold magnification using a microscope, and arbitrary 400 fibers among the reinforcing fibers within the field of view are selected for measurement of their lengths.

(iv) With the length of each fiber as Li, the weight average fiber length Lw is obtained from the following formula.

Formula: $L=(\acute{O}Li^2/\acute{O}Li)$

The FRP molded article of the invention can be produced by a method of molding a resin containing long fibers having an average fiber length of 0.1 to 7 mm. Therefore, the mold used and the parts combined with it and brought into contact with the flow of the resin are required to assure the desired dimensional accuracy of molded articles, to be durable and to allow stable production of molded articles.

It is preferred that the surface hardness of the valve pin 15 and the guide 36 (FIG. 37) is HRC45 to 68, considering wear resistance. A more preferred range is HRC58 to 68. If the reinforcing fibers are carbon fibers, a range of HRC60 to 68 is preferred.

It is preferred that the surface hardness of the gate bushes 22 (FIG. 37) is HRC45 to 68, considering the wear resistance. A more preferred range is HRC55 to 68.

The process for producing an FRP molded article of the invention is described below more particularly.

The process for producing an FRP molded article of the invention, comprises (a) a first step, in which resin pellets having resin-reinforcing fibers having an average fiber length of 0.1 to 7 mm mixed in a thermoplastic resin used as a matrix resin are heated and molten at 220 to 350° C. in a resin-melting cylinder of an injection molding machine, to prepare a molten resin having the fibers dispersed to exist in it, and (b) a second step, in which the molten resin obtained in the first step is fed to a hot-runner sprue through a first sprue of the injection molding machine and further through the resin passage of a hot-runner injection molding apparatus; the gate of the hot-runner sprue is opened and closed to control the start and end of injection of the molten resin into the cavity of the mold used for molding an article; the molten resin fed into the cavity is solidified in the mold; the mold is opened; and the molded article is taken out.

As required, a third step of finishing the surface of the molded article taken out of the mold at the portions corresponding to the gate portions, is added. As required, a fourth step of inserting metallic bits into the molded article taken out of the mold or the molded article obtained from the third step is added.

As required, a fifth step of processing (sanding) the surface of the molded article to make the surface smooth is added after the second step, third step or fourth step.

As required, a sixth step of washing the surface of the molded article and coating and drying the surface is added after the second step, third step, fourth step or fifth step.

As required, a seventh step of correcting the warping formed in the molded article is added after the second step, third step, fourth step, fifth step or sixth step.

As required, an eighth step of polishing the surface (including the coating surface) of the molded article is added after the second step, third step, fourth step, fifth step, sixth step or seventh step.

As required, a ninth step of inspecting the appearance and packing the molded article is added after the second step, third step, fourth step, fifth step, sixth step, seventh step or eighth step.

The capacity of the hot-runner injection molding machine used for the first step ranges from tens of tons to thousands of tons. The-capacity of the molding machine increases in proportion to the surface area of the molded article to be produced. For example, in the case where molded articles having a surface area of A4 size are produced, it is preferred to use a hot-runner injection molding machine having a capacity of 350 tons or more.

It is preferred that the heating temperature set for the heater installed in the cylinder of the hot-runner injection molding machine is 220 to 350° C. In view of assuring the kneadability of the long fiber-reinforced resin and the sufficient flowability necessary for injection molding, a more preferred range is 240 to 330° C. In the case of a thermoplastic resin mainly composed of a polyamide resin, it is preferred that the temperature is 240 to 320° C.

In the second step, the long fiber-reinforced thermoplastic resin molten in the first step is made to flow into the mold cavity of the hot-runner injection molding apparatus. The quantity and timing of the inflow of the resin containing reinforcing fibers into the mold cavity are controlled by a method of opening and closing the valve pins in the hot-runner sprues.

To keep the resin always molten, the hot-runner manifold and the hot-runner sprues are kept at a high temperature. It is preferred that the temperature is set at 220 to 350° C. In view of the kneadability of the long fiber-reinforced resin and the sufficient flowability necessary for injection molding, a more preferred range is 240 to 330° C. In the case where the thermoplastic resin is mainly composed of a polyamide resin, a preferred range is 240 to 320° C.

In the third step, the solidified molded article is taken out of the mold, and the surface is finished at the portions corresponding to the gate portions. The portions of the hot-runner injection-molded article corresponding to gates have depressions as valve pin marks. Whether or not the forms of the depressions conform to the appearance standard of the molded article is judged, and based on the result, whether or not the molded article is processed in the third-step is decided.

In the third step, usually, a machine tool having a rotary knife is used to remove the forms of depressions, or the depressions are packed with a thermoplastic resin, thermosetting resin, rubber or putty, etc.

In the fourth step, metallic bits are inserted into the molded article. In general, the housing as the molded article accommodates various functional parts in it. So, it is necessary to let the housing have a threadably engaging mechanism. The engaging mechanism can be installed by thermally inserting metallic bits heated to a temperature of about 280 to 320° C., into a boss, since the housing is-made of a thermoplastic resin.

The engaging mechanism can also be installed without using the fourth step. A boss having holes smaller than the screw diameter is formed while the molded article is molded, and after completion of molding, self-tapping screws can be turned into the holes for threading them.

In the fifth step, the surface of the molded article is processed to be smooth (sanded). To obtain good appearance of coating, the surface of the molded article is processed to be smooth before coating. For example, a wet or dry processing method using sand paper or a processing method using a sandblaster can be used.

In the sixth step, the surface of the molded article is washed, coated as predetermined, and dried. For coating the molded article obtained from a long fiber-reinforced thermoplastic resin, coating materials of various colors and touches can be used.

In the seventh step, the warping of the molded article is corrected. A long fiber-reinforced thermoplastic resin can be made into molded articles of various shapes, and depending on the shape of the molded article, the tolerances of warping and torsion are narrow. The molded article narrow in the tolerances of warping and torsion is corrected in warping and torsion.

The correction is usually carried out by a method of fixing the molded article into a jig designed to obtain a desired shape, heating the molded article in this state for a certain time, and cooling. It is preferred that the heating temperature is higher than the glass transition temperature (Tg) and lower than the thermal deformation temperature of the main resin of the molded article. It is preferred that the temperature is 40 to 200° C., and a more preferred range is 50 to 180° C. In the case where the main ingredient of the resin is a polyamide, it is preferred that the temperature is 70 to 140° C.

EXAMPLES

In Examples 1–15 and Comparative Example 1, the following conditions were used.

Figure 13A:
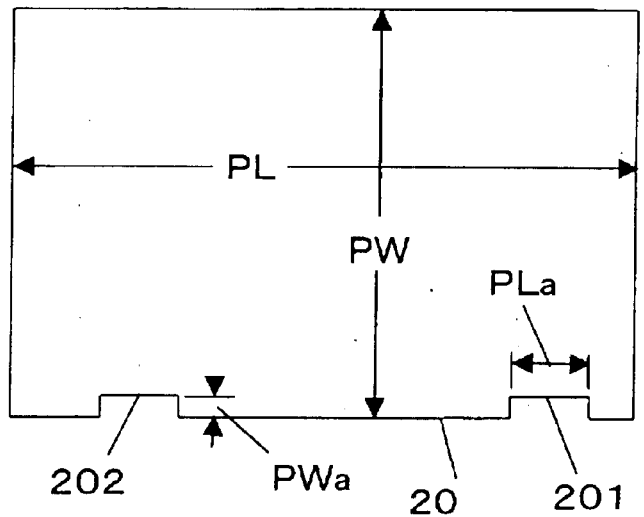
FIG. 13A is a plan view of a housing as an example of a molded article of the invention.
Figure 13B:
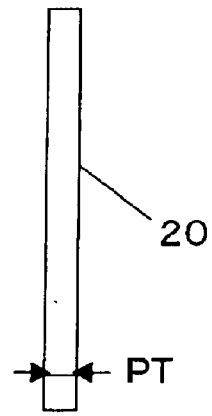
FIG. 13B is a side view of the housing shown in FIG. 13A.

The molded product produced in each example was an LCD panel housing 20 for a notebook type personal computer shown in FIGS. 13A and 13B. The panel 20 had a length (PL) of 310 mm, a width (PW) of 240 mm and a thickness (PT) of 15 mm. In one of the two sides in the length direction, two depressions 201 and 202, each having a length (PLa) of 40 mm and a width (PWa) of 10 mm, were formed.

The material of the pellets fed into the molten resin extruder 3 used for producing the molded article 20 consisted of a polyamide resin ("Amilan" CM1004 produced by Toray Industries, Inc.), needle-like potassium titanate filler (Tismo D produced by Otsuka Chemical Co., Ltd.), and carbon fibers ("Torayca" T700S-12K-60E produced by Toray Industries, Inc.). The material contained 1 wt % of the needle-like filler and 20 wt % of the reinforcing fibers. Pellets were produced by melt-molding the material into a linear molded article and cutting it at a length of 7 mm. The length of the reinforcing fibers contained in the pellets was substantially 7 mm.

As the molten resin extruder 3, JSW350-E2-SP was used. The resin temperatures in the cylinder were 260° C. (nozzle section), 270° C. (nozzle section), 280° C. (metering section), 280° C. (compression section), 270° C. (feed section) and 260° C. (feed section), in the direction from the nozzle to the side of the hopper.

The resin temperature in the hot-runner manifold 9 (FIG. 2) was 280° C., and the set temperature of the hot-runner sprues 8 was 270° C. Each of the hole diameter of the gate holes 14a (FIG. 37) of the hot-runner sprues 8 was 1.5 mm. The material of the sprue bushes 22 was HPM31.

The material of the cavity 6 and the core 7 of the mold 2 was NAK60, and their surfaces were nitrided. The set temperature of the mold was 50° C. at both the cavity 6 and the core 7.

Figure 14:
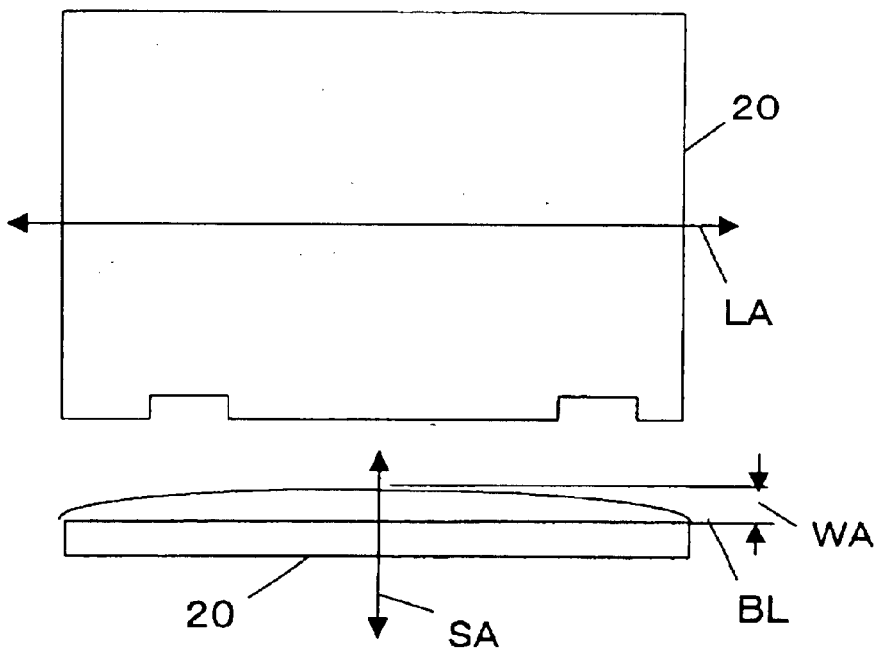
FIG. 14 is an illustration for explaining a method of measuring warping of a molded article of the invention. The top drawing is a plan view of the molded article and the bottom drawing is a front view of it.

On each of the molded articles 20 obtained in the respective examples and comparative example, the amount of warping was measured. The measuring method is shown with FIG. 14, that is, the deviation from the straight line (BL) in the direction of the short axis (SA) of the molded article 20 (the thickness direction of the molded article 20) along the straight line in the direction of the central long axis (LA) of the molded article 20 was measured and thus obtained value was used as the warping value (WA).

Example 1

As the hot-runner injection molding apparatus, SVP injection molding apparatus produced by Seiki Corp. was used as the base, and the length of the hot-runner sprues 8 was 125 mm, while the hole diameter of the gate holes 14a was 1.5 mm.

Figure 16:
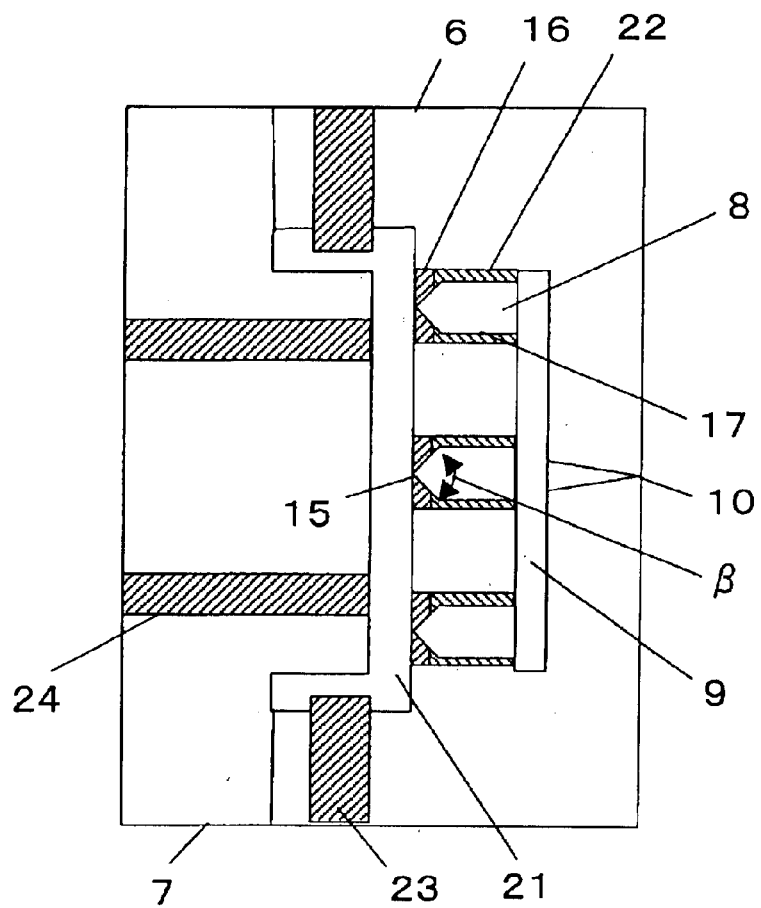
FIG. 16 is a typical vertical sectional view of the mold section in the hot-runner injection molding apparatus used in Examples 1 through 10.

The hot-runner manifold 9 was a rectangle having a height of 150 mm, a length of 340 mm and a width of 340 mm, and the inside resin passages had a cross sectional form of a circle having a diameter of 8 mm. The material of the hot-runner manifold 9 and the hot-runner sprues 8 was SK3. The approximate vertical sections of the fixed side plate 4, the movable side plate 5, and the cavity 6 and the core 7 of the mold 2 are shown in FIG. 16.

At one end face of the cavity 6, the first sprue 10 was installed, and the first sprue 10 communicated to the hot-runner manifold 9. At the tip of the hot-runner manifold 9, the hot-runner sprues 8 were provided. The tips of the hot-runner sprues 8 were opened into the mold hollow section 21 through the gate pins 15. The mold hollow section 21 was formed between the cavity 6 and the core 7 opposing the cavity 6. To the core 7, knockout pins 24 are attached. In the cavity 6, slide cores 23 were provided from its lateral faces toward the mold hollow section 21. The apical angle (β) at the tip portions of the hot-runner sprues 8 was 80°.

The ratio of the longest resin passage (SL) to the shortest resin passage (SS) among the resin passages in the hot-runner manifold 9 was SL/SS=1.12.

Figure 17:
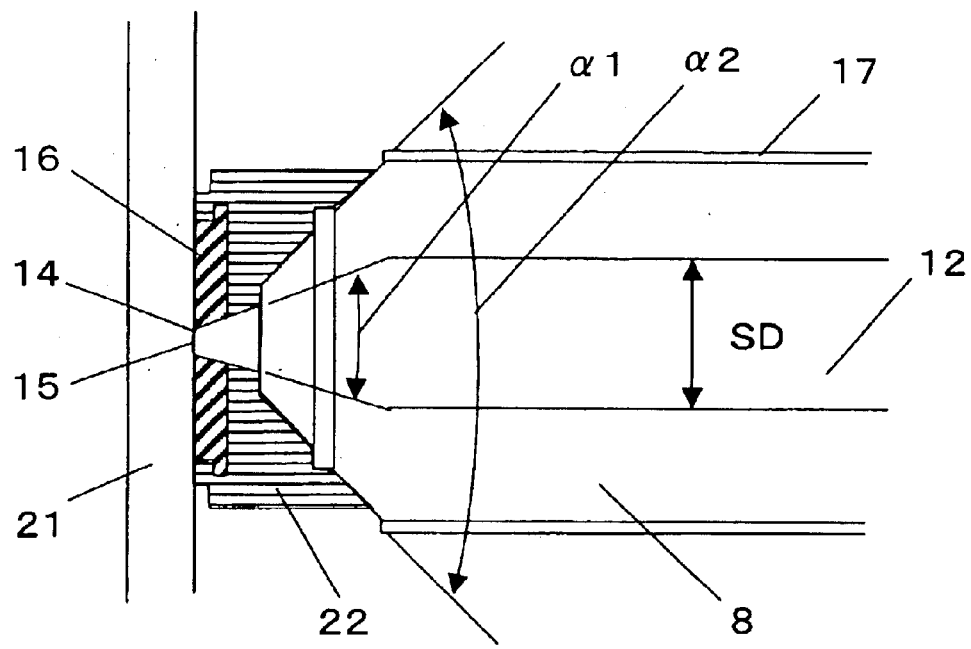
FIG. 17 is a vertical sectional detail view of the tip portion of one of the hot-runner sprues shown in FIG. 16.

The vertical sectional view at the tip of one of the hot-runner sprues 8 near the gate portion 14 is shown in FIG. 17. On the face of the gate portion 14 opposing the mold hollow section 21 of the mold 2, the heat insulating material 16 was provided. The heat insulating material 16 was made of stainless alloy PSL (produced by Hitachi Metals, Ltd.) and was a plate having a thickness of 3 mm and a diameter of 30 mm, with a through hole having a diameter of 1.5 mm formed at the center.

In FIG. 17, the hot-runner sprue 8 had the hollow section 12 having a diameter (SD) of 12 mm in the axial direction. The hollow section 12 formed a resin passage, and the gate pin 15 was inserted into the hollow section 12. The apical angle ($\alpha 1$) at the tip portion of the hollow section 12 was 65° C. The apical angle ($\alpha 2$) at the tip portion of the outside surface of the hot-runner sprue 8 was 80°. At the tip portion, the sprue bush 22 was provided, and the resin passage provided in the center of the sprue bush communicated, at one end, to the hollow section 12, and, at the other end, to the gate portion 14. Around the hot-runner sprue 8, the heat insulating layer 17 with air contained in it was formed.

Figure 15:
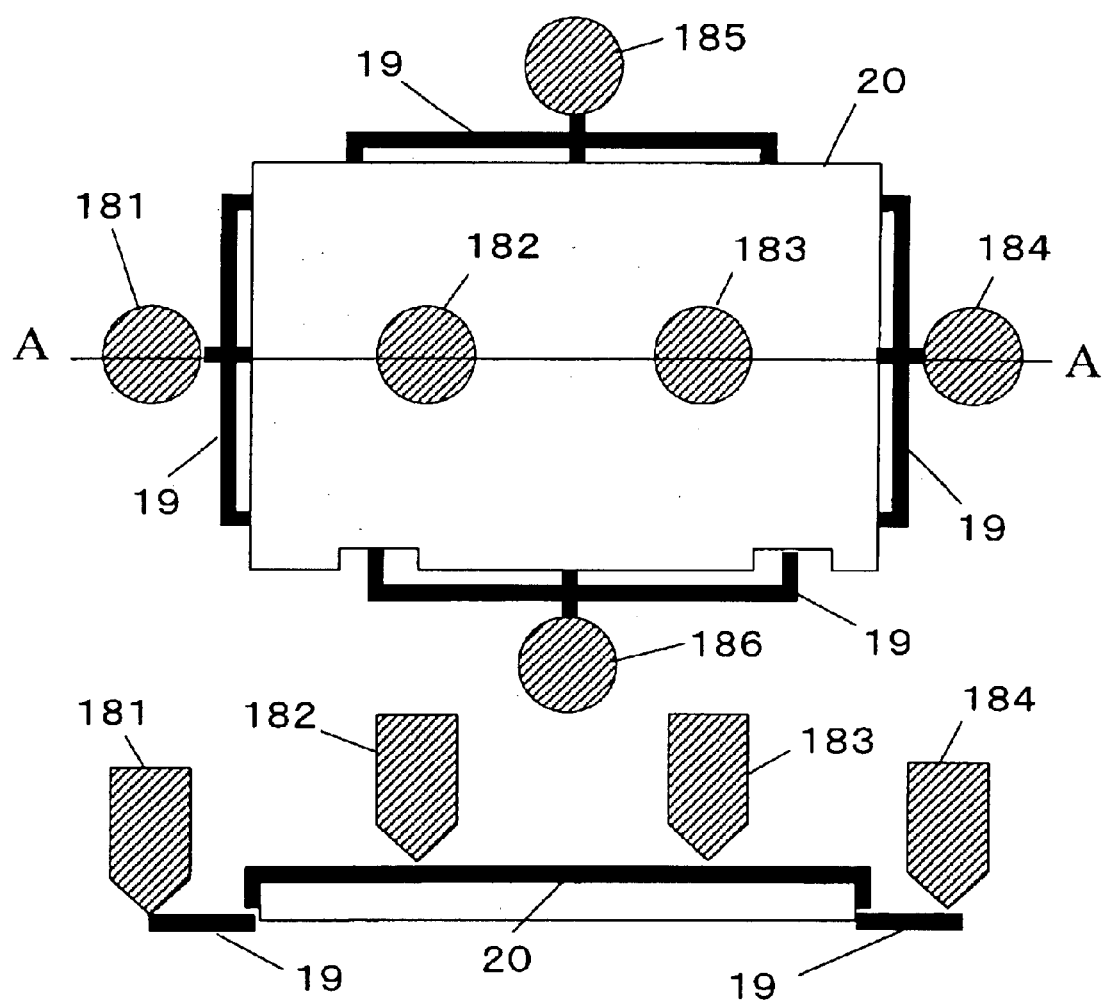
FIG. 15 is an illustration showing the gate layout used in Example 1. The top drawing is a plan view of the gate layout and the bottom drawing is a vertical sectional view at the A—A position shown in the plan view.

The mold 2 was of the front gate method. The arrangement of six hot-runner sprues 181 to 186 for the molded article 20 is shown in the plan view at top in FIG. 15. Since the respective gates of the hot-runner sprues 181, 184, 185 and 186 were located outside the face of the molded article 20, there existed sprue runners 19 to be thrown away. This mold 2 was used to produce molded article 20.

Example 2

Figure 18:
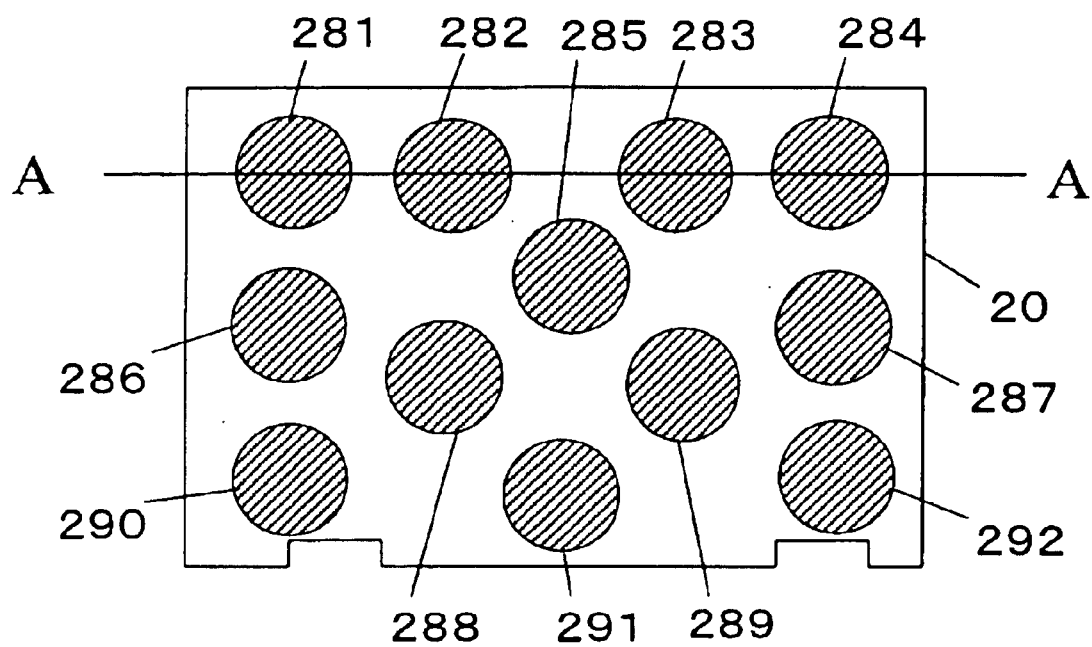
FIG. 18 is an illustration of the gate layout used in Example 2. The top drawing is a plan view of the gate layout and the bottom drawing is the vertical sectional view of it at the A—A position shown in the plan view.
Figure 18:
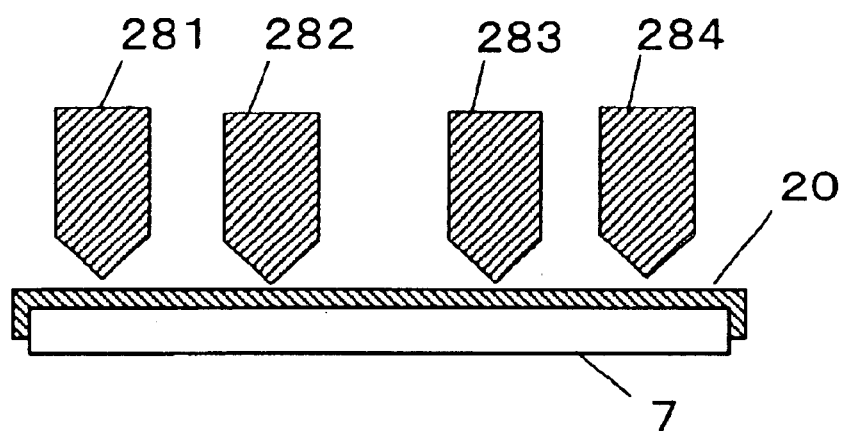

The mold 2 was of the front gate method. The arrangement of twelve hot-runner sprues 281 to 292 for the molded article 20 is shown in the plan view at top in FIG. 18. The mold 2 was used and the molded article 20 was produced in the same manner described in Example 1.

Example 3

Figure 19:
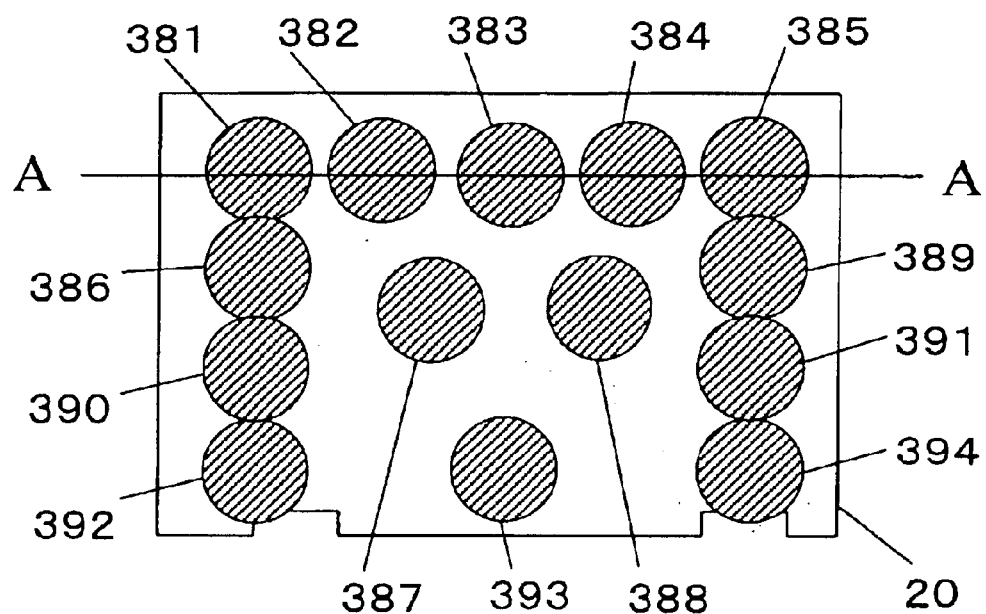
FIG. 19 is an illustration of the gate layout used in Example 3. The top drawing shows a plan view of the gate layout and the bottom drawing shows the vertical sectional view of it at the A—A position shown in the plan view.
Figure 19:
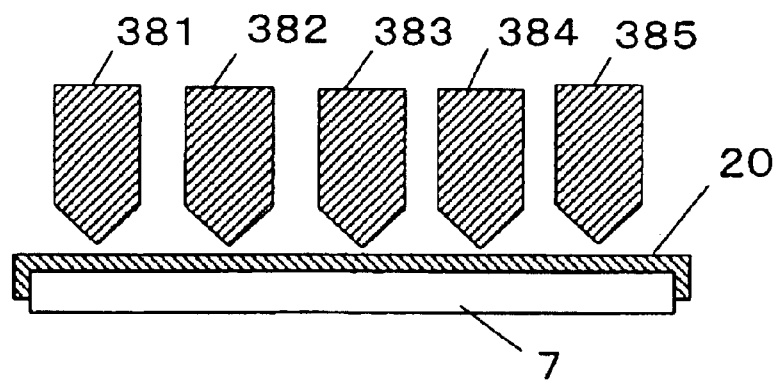

The mold 2 was of the front gate method. The arrangement of fourteen hot-runner sprues 381 to 394 for the molded article 20 is shown in the plan view at top in FIG. 19. The mold 2 was used and the molded article 20 was produced in the same manner described in Example 1.

Example 4

Figure 20:
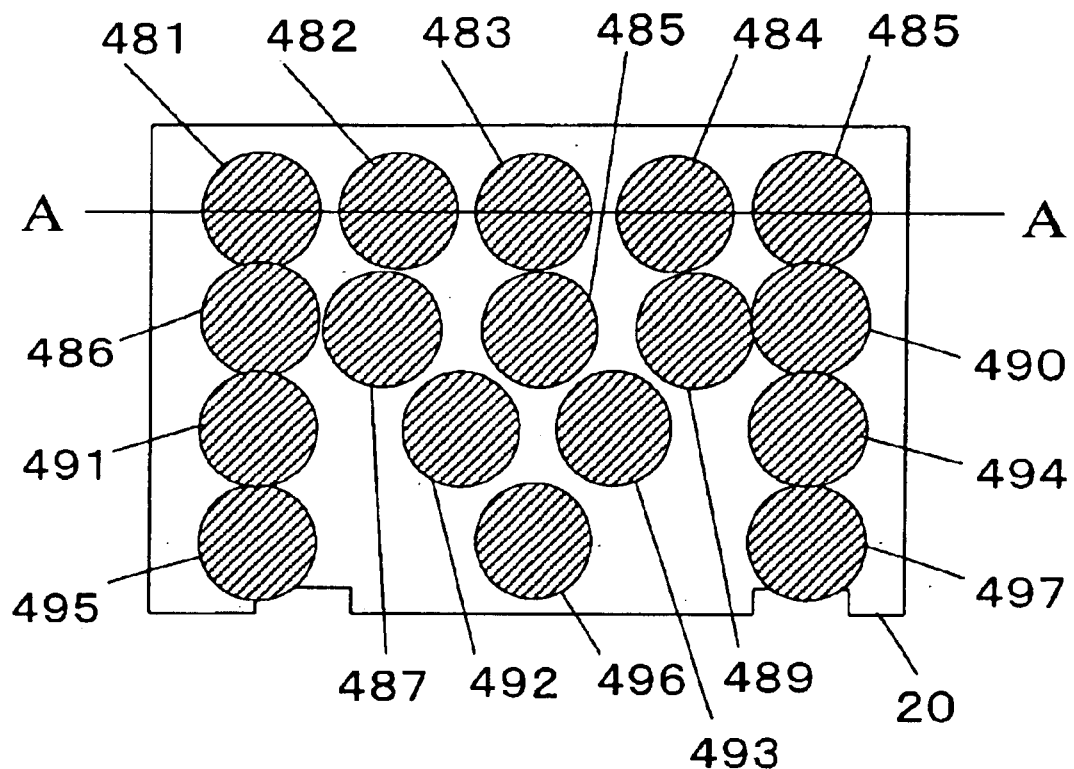
FIG. 20 is an illustration of the gate layout used in Example 4. The top drawing shows a plan view of the gate layout and the bottom drawing shows the vertical sectional view of it at the A—A position shown in the plan view.
Figure 20:
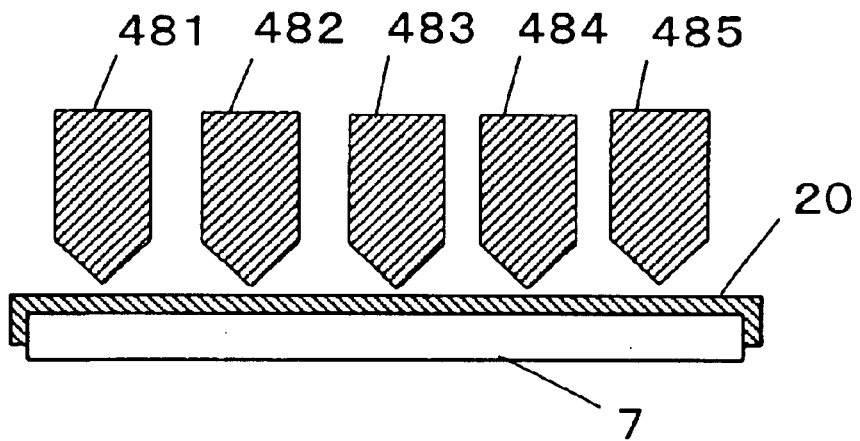

The mold 2 was of the front gate method. The arrangement of seventeen hot-runner sprues 481 to 497 for the molded article 20 is shown in the plan view at top in FIG. 20. The mold 2 was used and the molded article 20 was produced in the same manner described in Example 1.

Example 5

Figure 21:
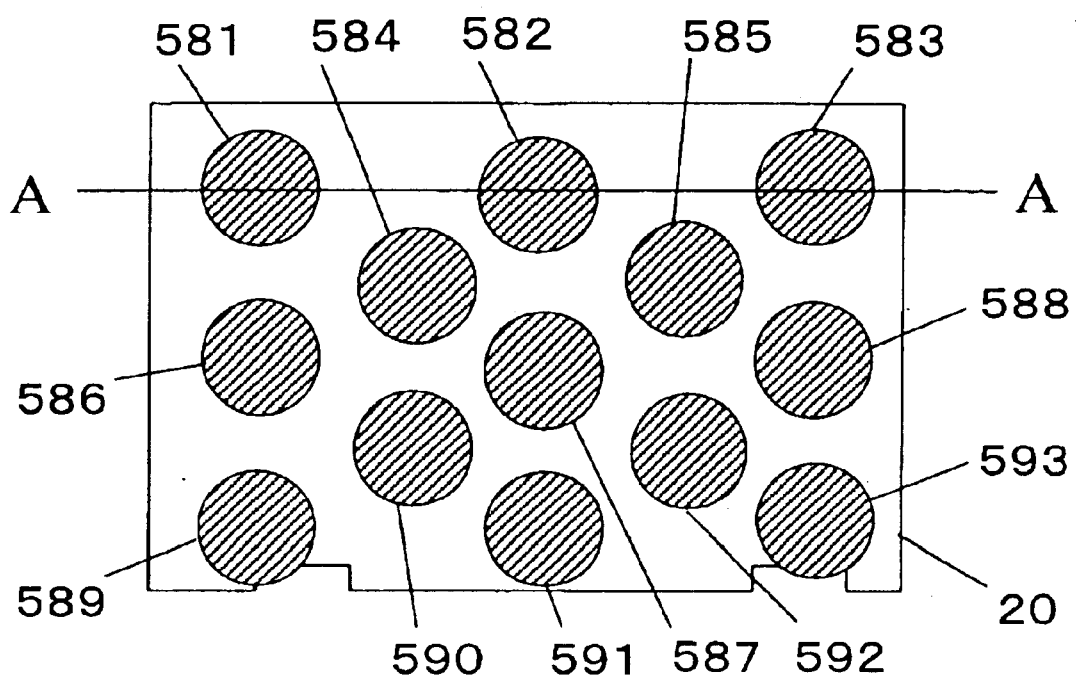
FIG. 21 is an illustration showing the gate layout used in Example 5. The top drawing shows a plan view of the gate layout, and the bottom drawing, the vertical sectional view at the A—A position shown in the plan view.
Figure 21:
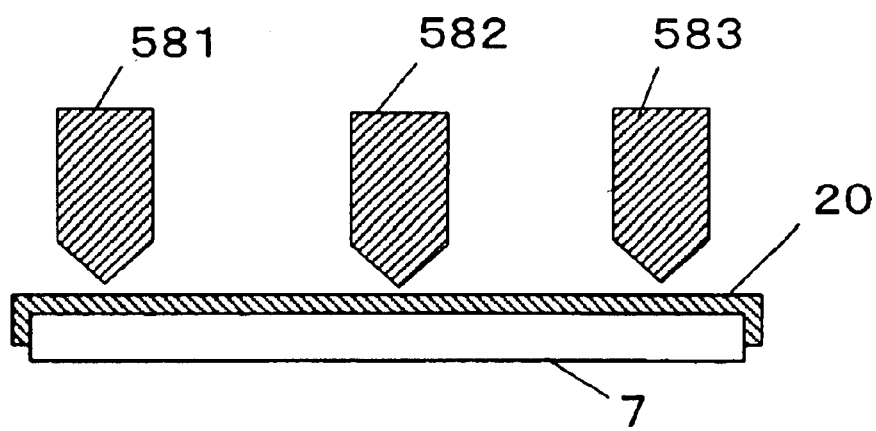

The mold 2 was of the front gate method. The arrangement of thirteen hot-runner sprues 581 to 593 for the molded article 20 is shown in the plan view at top in FIG. 21. The mold 2 was used and the molded article 20 was produced in the same manner described in Example 1.

Example 6

Figure 22:
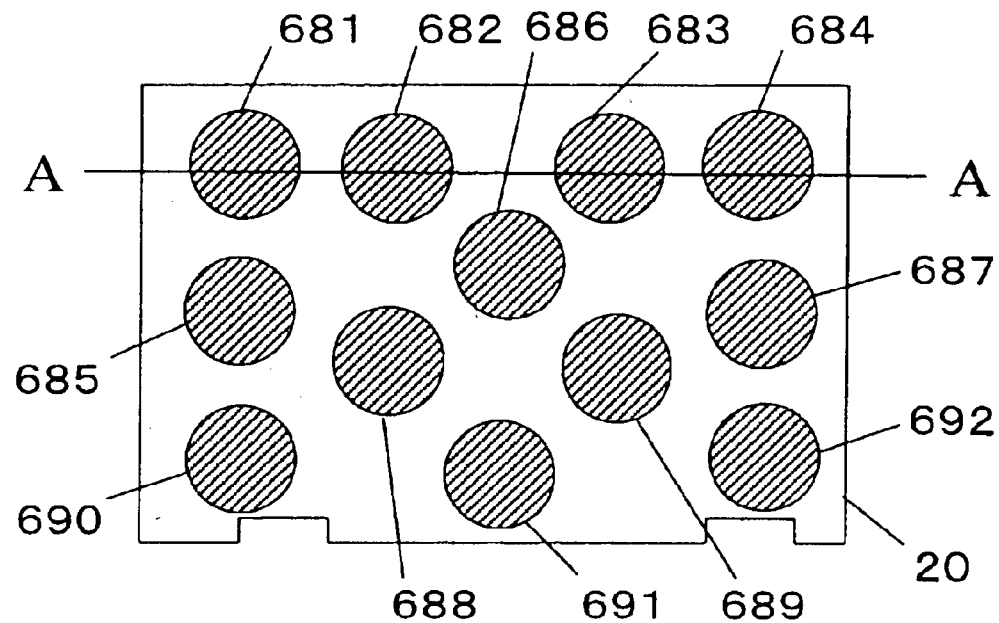
FIG. 22 is an illustration of the gate layout used in Example 6. The top drawing shows a plan view of the gate layout and the bottom drawing shows the vertical sectional view of it at the A—A position shown in the plan view.
Figure 22:
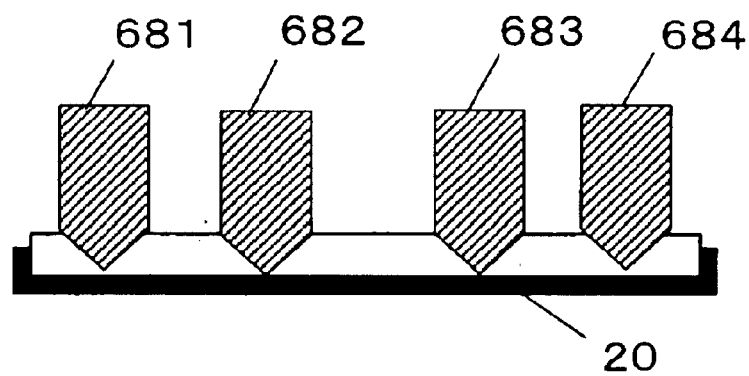

The mold was of the reverse gate method. The arrangement of twelve hot-runner sprues 681 to 692 for the molded article 20 is shown in the plan view at top in FIG. 22. The mold 2 was used and the molded article 20 was produced in the same manner described in Example 1. However, the length of the hot-runner sprues was set in 320 mm.

Example 7

Figure 23:
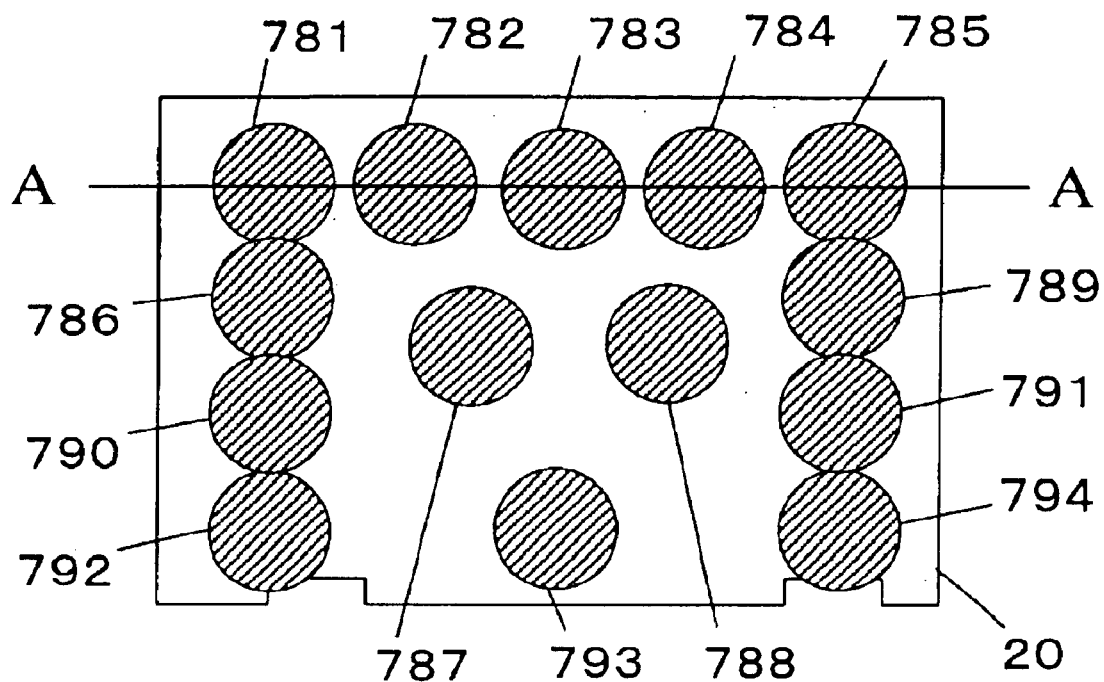
FIG. 23 is an illustration of the gate layout used in Example 7. The top drawing shows a plan view of the gate layout and the bottom drawing shows the vertical sectional view of it at the A—A position shown in the plan view.
Figure 23:
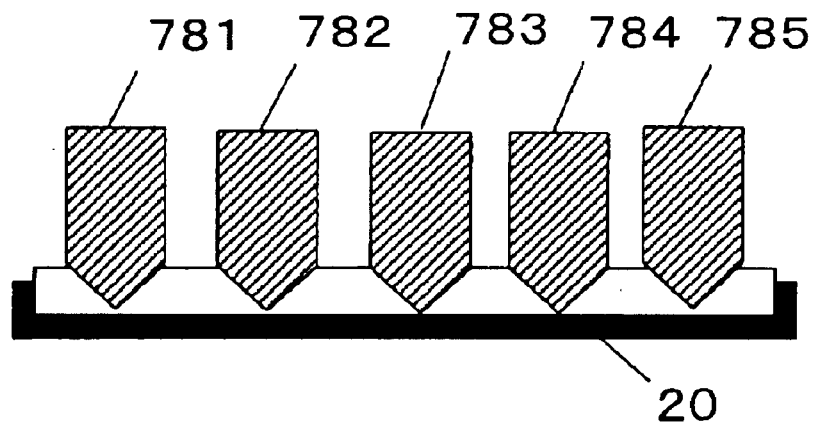

The mold was of the reverse gate method. The arrangement of fourteen hot-runner sprues 781 to 794 for the molded article. 20 is shown in the plan view at top in FIG. 23. The mold 2 was used and the molded article 20 was produced in the same manner described in Example 1. However, the length of the hot-runner sprues was set in 320 mm.

Example 8

Figure 24:
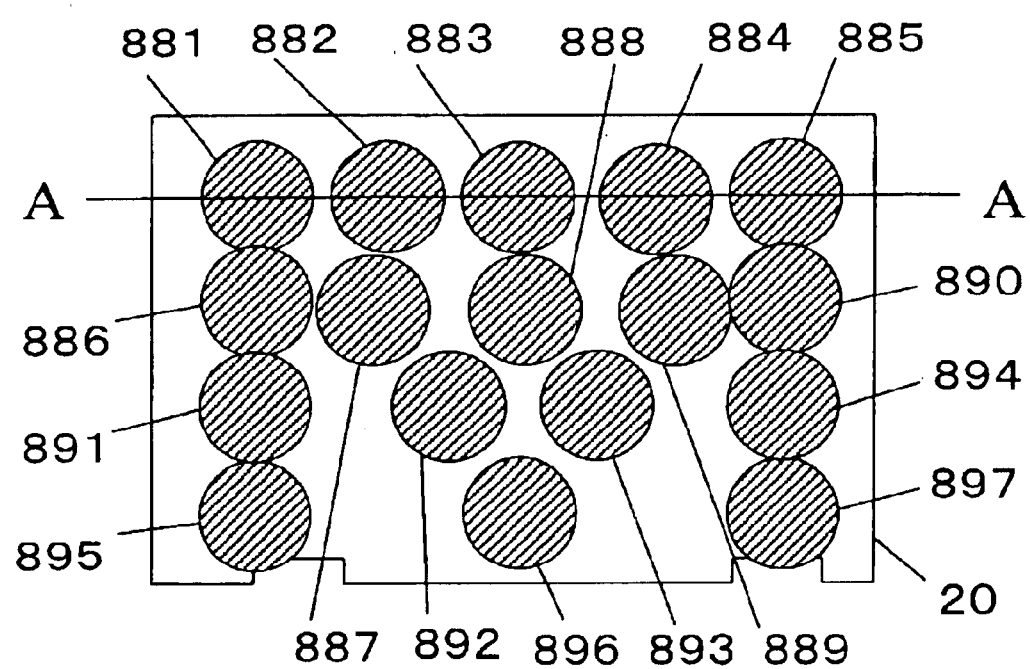
FIG. 24 is an illustration of the gate layout used in Example 8. The top drawing shows a plan view of the gate layout and the bottom drawing shows the vertical sectional view of it at the A—A position shown in the plan view.
Figure 24:
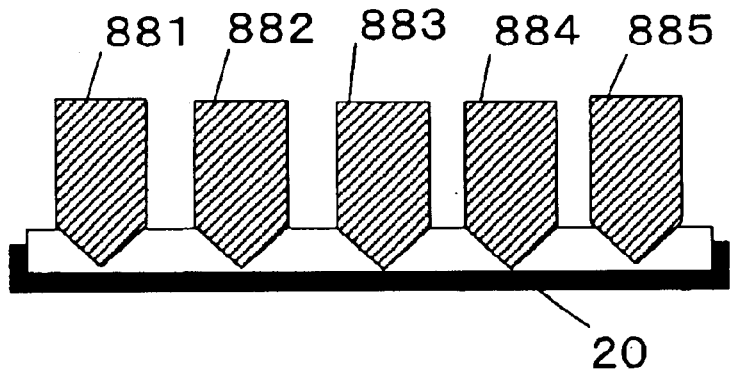

The mold was of the reverse gate method. The arrangement of seventeen hot-runner sprues 881 to 897 for the molded article 20 is shown in the plan view at top in FIG. 24. The mold 2 was used and the molded article 20 was produced in the same manner described in Example 1. However, the length of the hot-runner sprues was set in 320 mm.

Example 9

Figure 25:
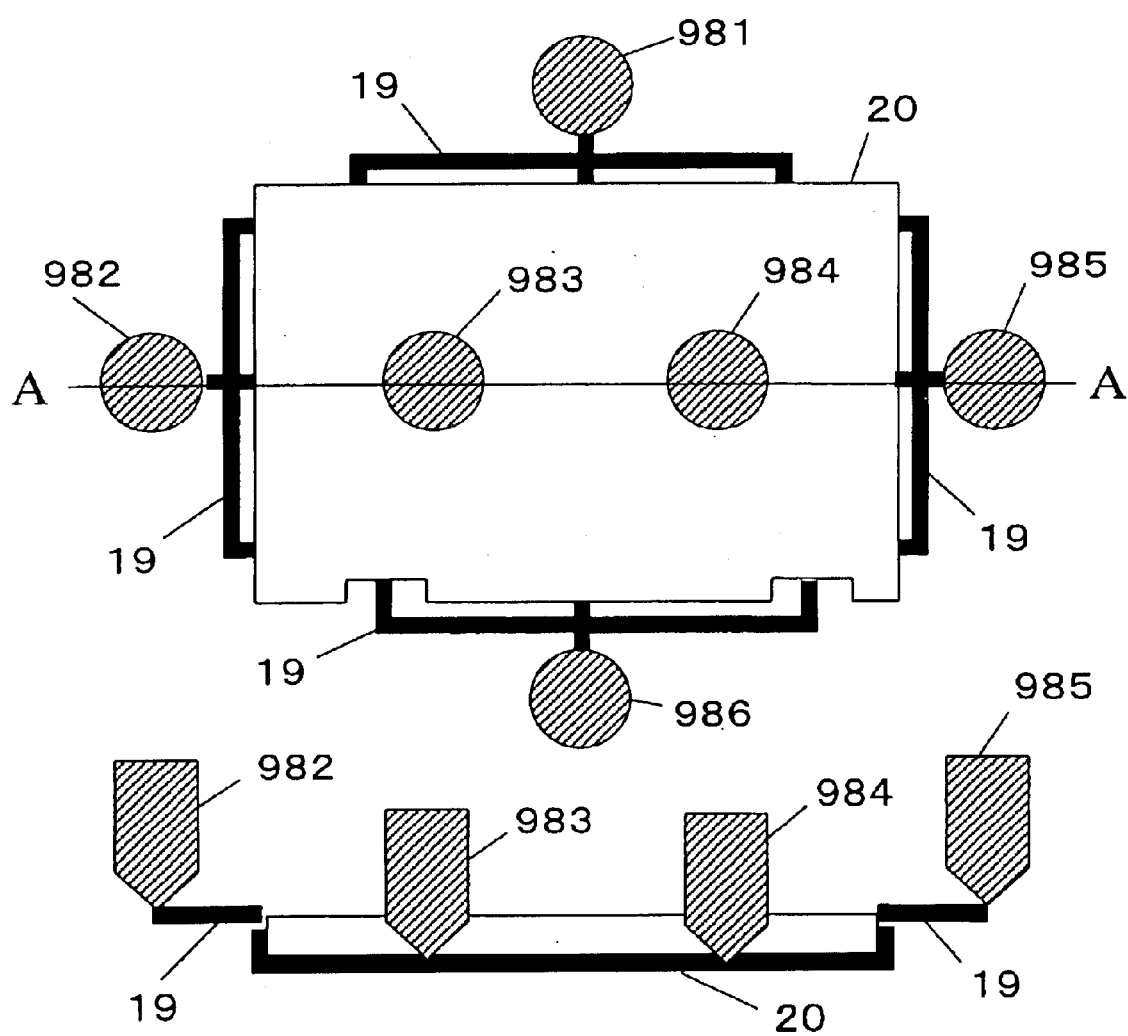
FIG. 25 is an illustration of the gate layout used in Example 9. The top drawing shows a plan view of the gate layout and the bottom drawing shows the vertical sectional view of it at the A—A position shown in the plan view.

The mold was of the reverse gate method. The arrangement of six hot-runner sprues 981 to 986 for the molded article 20 is shown in the plan view at top in FIG. 25. The mold 2 was used and the molded article 20 was produced in the same manner described in Example 1. However, the length of the hot-runner sprues was set in 320 mm. As in Example 1, since the respective gates of the hot-runner sprues 981, 982, 985 and 986 were located outside the face of the molded article 20, there existed sprue runners 19 to be thrown away.

FIG. 26 shows the resin passages 25 from the first sprue 10 to the respective hot-runner sprues 981 to 986 in the hot-runner manifold 9 used in this molding.

Example 10

Figure 27:
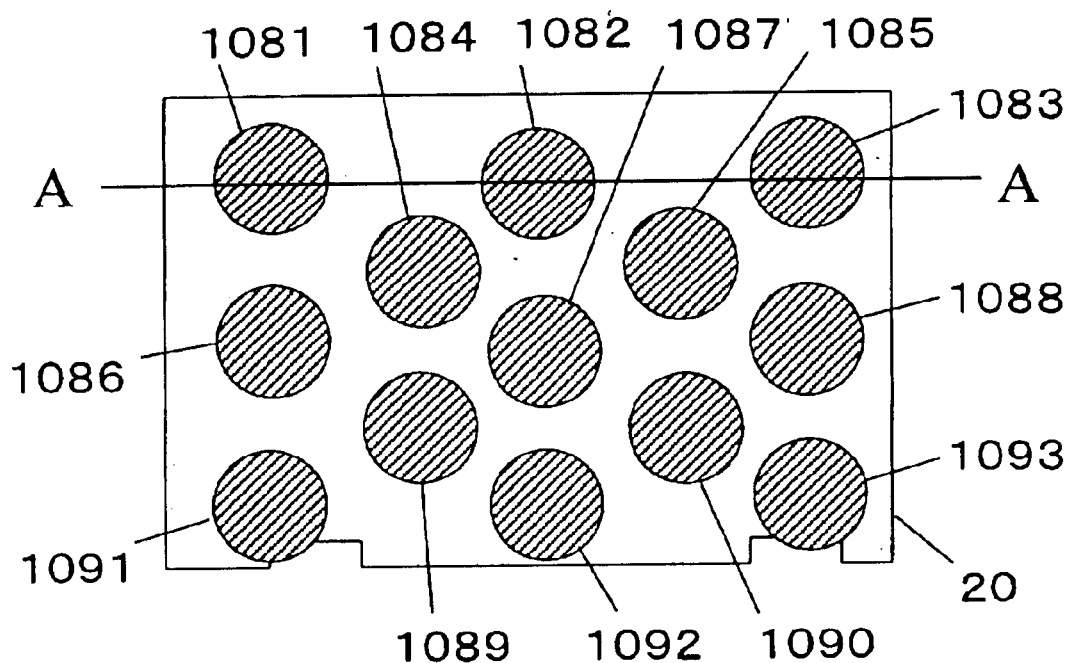
FIG. 27 is an illustration of the gate layout used in Example 10. The top drawing is a plan view of the gate layout and the bottom drawing is a vertical sectional view of it at the A—A position shown in the plan view.
Figure 27:
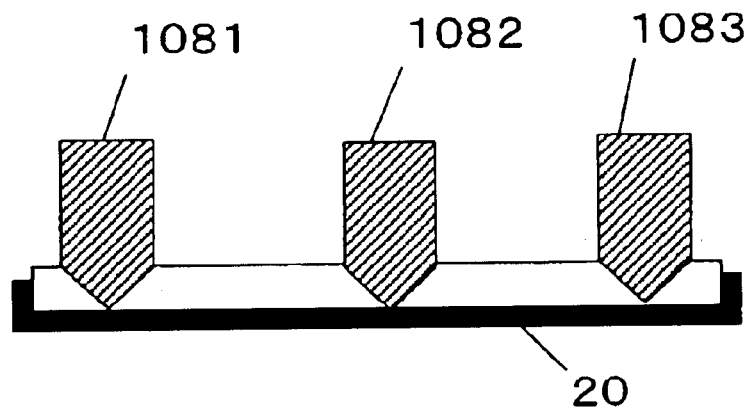

The mold was of the reverse gate method. The arrangement of thirteen hot-runner sprues 1081 to 1093 for the molded article 20 is shown in the plan view at top in FIG. 27. The mold 2 was used and the molded article 20 was produced in the same manner described in Example 1. However, the length of the hot-runner sprues was set in 220 mm.

Example 11

Figure 34:
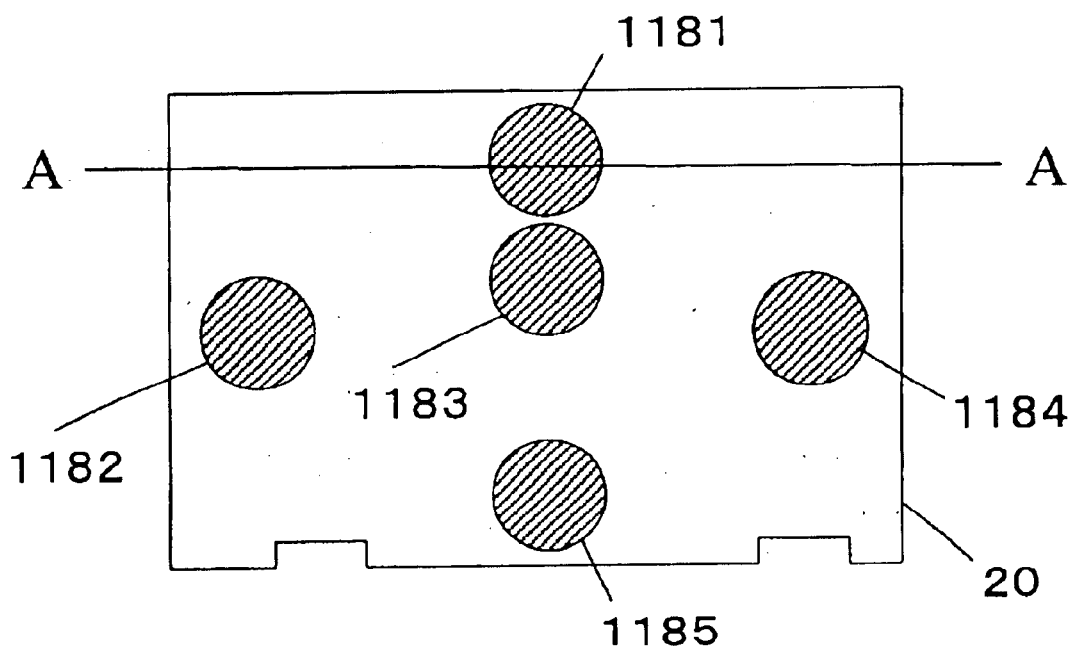
FIG. 34 is an illustration of the gate layout used in Example 11. The top drawing shows a plan view of the gate layout and the bottom drawing is a vertical sectional view of it at the A—A position shown in the plan view.
Figure 34:
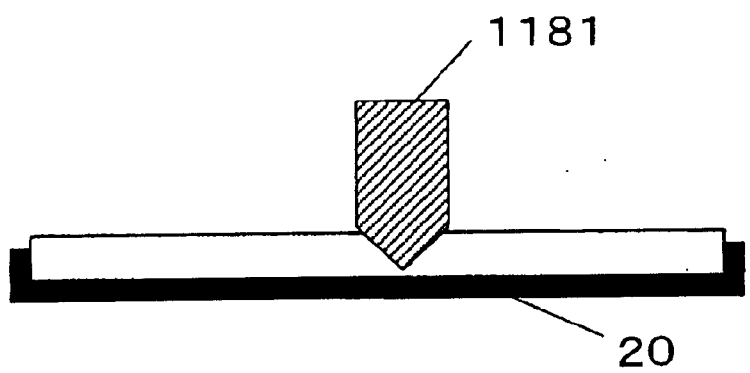

The mold was of the reverse gate method. The arrangement of five hot-runner sprues 1181 to 1185 for the molded article 20 is shown in the plan view at top in FIG. 34. The mold 2 was used and the molded article 20 was produced in the same manner described in Example 1. However, the length of the hot-runner sprues was set in 320 mm.

Example 12

The mold was of the reverse gate method. The arrangement of six hot-runner sprues 1281 to 1286 for the molded article 20 is shown in the plan view at top in FIG. 31. The mold 2 was used and the molded article 20 was produced in the same manner described in Example 1. However, the length of the hot-runner sprues was set in 320 mm.

Example 13

Figure 35:
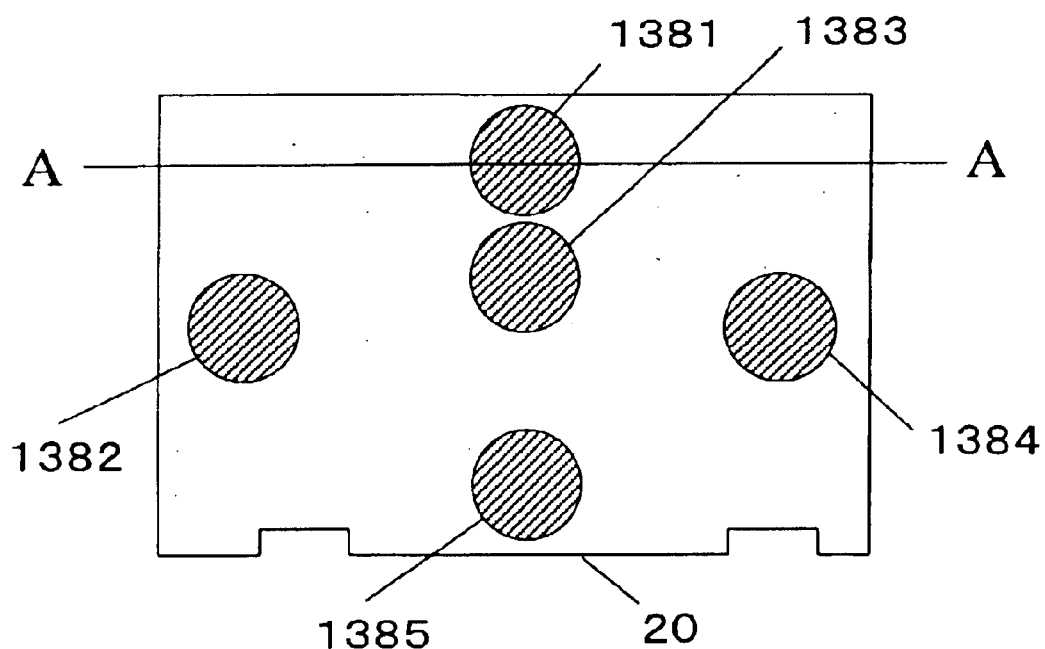
FIG. 35 is an illustration of the gate layout used in Example 13. The top drawing shows a plan view of the gate layout and the bottom drawing is a vertical sectional view of it at the A—A position shown in the plan view.
Figure 35:
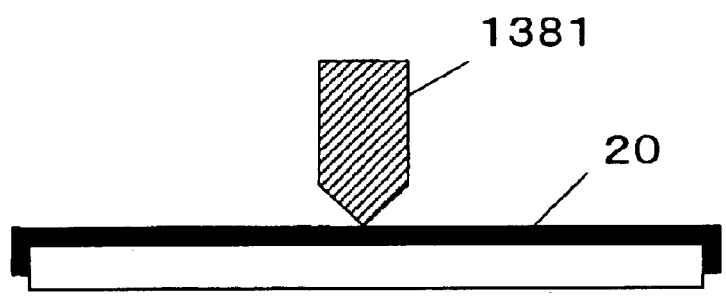

The mold was of the reverse gate method. The arrangement of five hot-runner sprues 1381 to 1385 for the molded article 20 is shown in the plan view at top in FIG. 35. The mold 2 was used and the molded article 20 was produced in the same manner described in Example 1. However, the length of the hot-runner sprues was set in 125 mm.

Example 14

Figure 36:
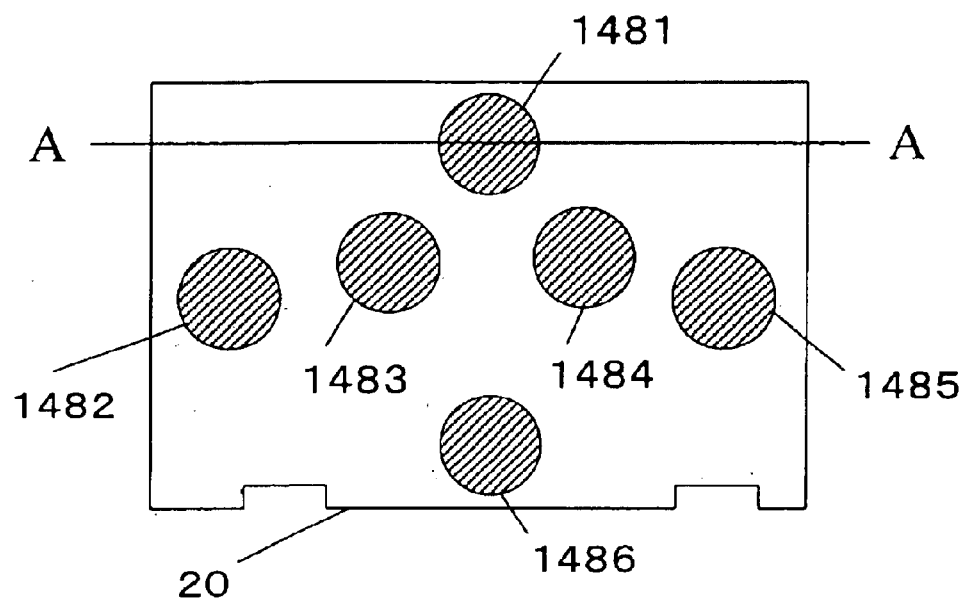
FIG. 36 is an illustration of the gate layout used in Example 14. The top drawing shows a plan view of the gate layout and the bottom drawing is a vertical sectional view of it at the A—A position shown in the plan view.
Figure 36:
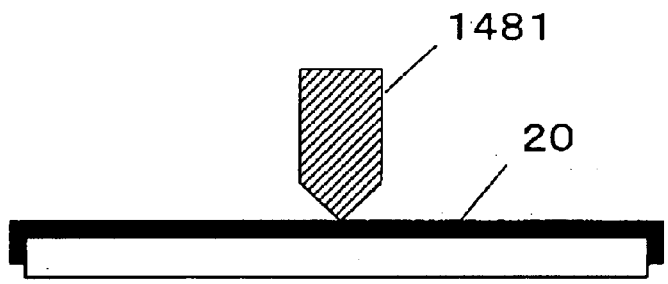

The mold was of the reverse gate method. The arrangement of six hot-runner sprues 1481 to 1486 for the molded article 20 is shown in the plan view at top in FIG. 36. The mold 2 was used and the molded article 20 was produced in the same manner described in Example 1. However, the length of the hot-runner sprues was set in 125 mm.

Comparative Example 1

Figure 28:
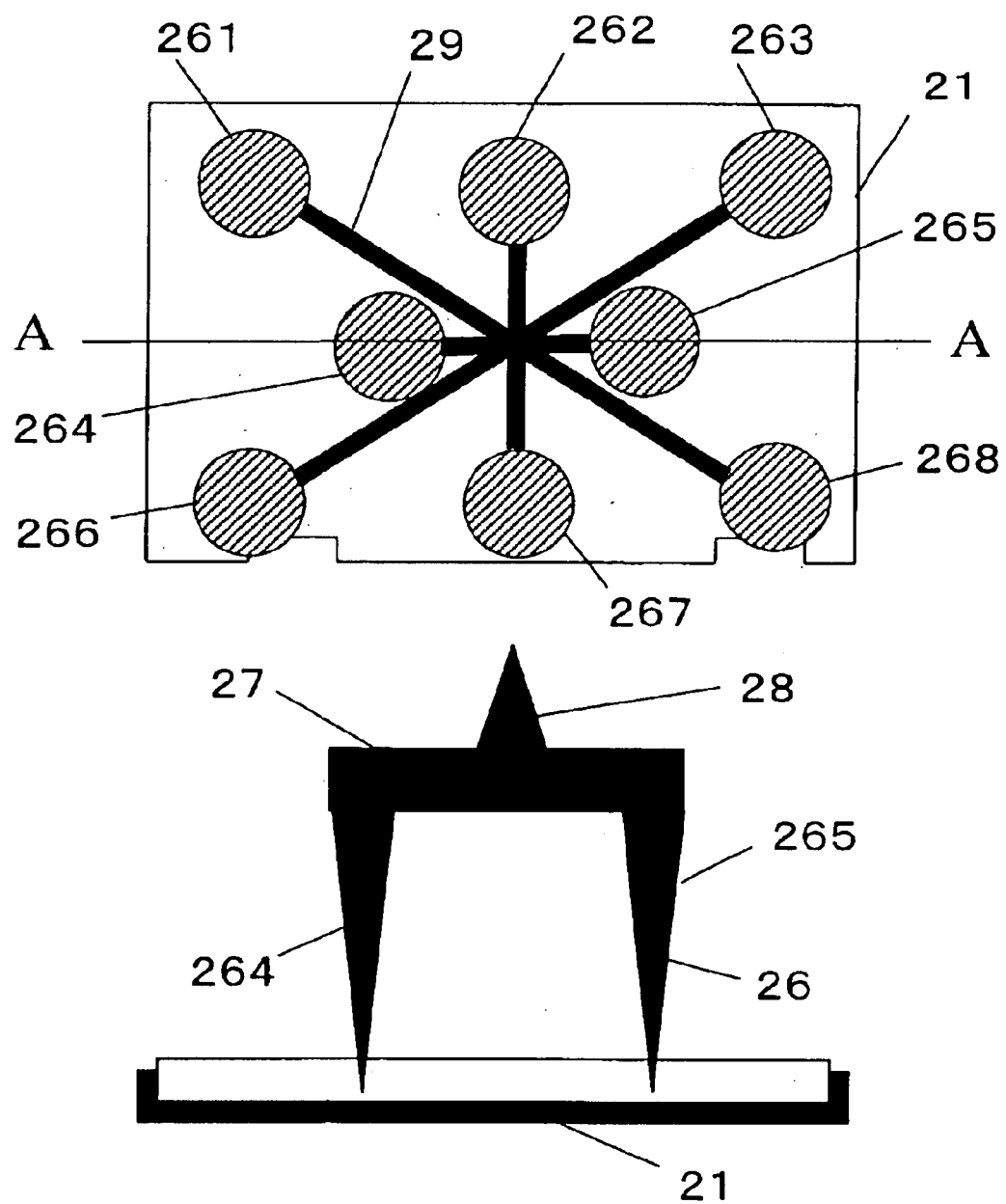
FIG. 28 is an illustration of the gate layout of the conventional cold-runner injection molding apparatus used in Comparative Example 1. The top drawing is a plan view of the gate layout and the bottom drawing is a vertical sectional view of it at the A—A position shown in the plan view.
Figure 29:
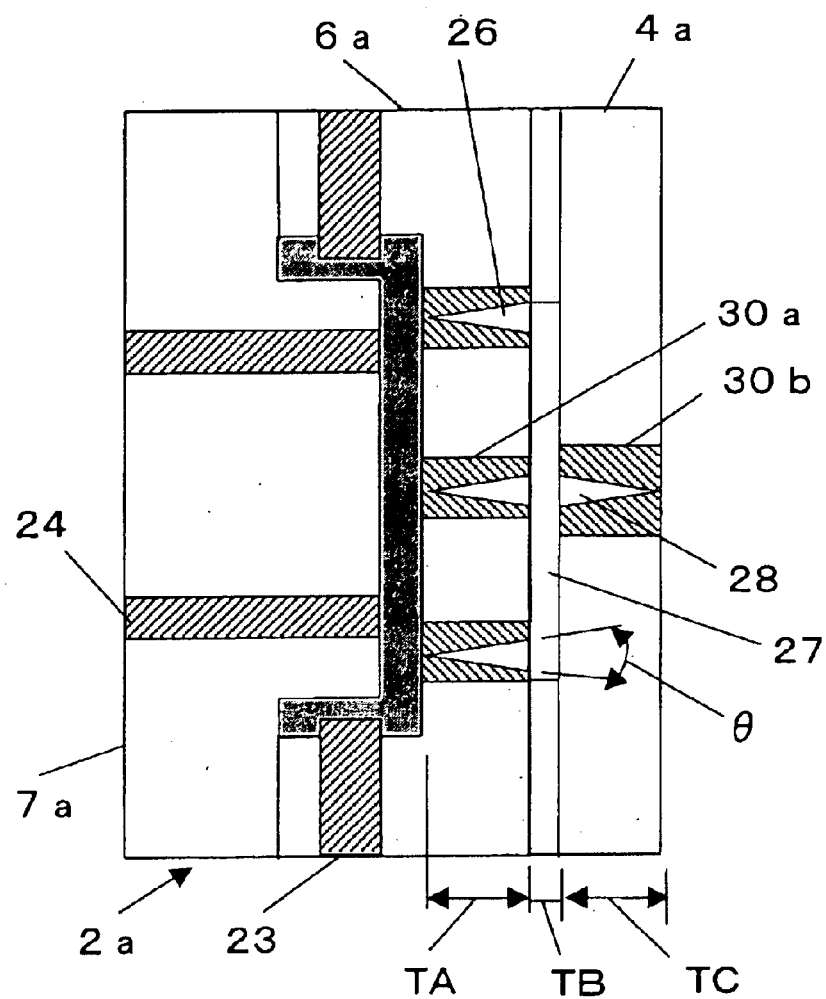
FIG. 29 is a typical vertical sectional view showing the mold section in the cold-runner injection molding apparatus used in Comparative Example 1.

FIGS. 28 and 29 show the mold portion of a generally used conventional cold-runner injection molding machine. In FIG. 29, a mold 2a comprises a cavity 6a and a core 7a opposing it, and in the core 7a, slide cores 23 and knockout pins 24 are provided. In the cavity 6a, plural bushes 30a are provided, and in them, sprues 26 are respectively formed. The respective sprues 26 communicate to the resin passage of a runner 27 provided outside the cavity 6a. The resin passage communicates to the first sprue 28 formed in the bush 30b provided in a fixed side plate 4a. The first sprue 28 communicates to a resin melting extruder (not illustrated). The length (TA) of the bushes 30a is 220 mm, the thickness (TB) of the runner 27 is 7 mm and the length (TC) of the bush 30b is 50 mm. The apical angle (θ) at the tip portion of the sprue 26 is 12°.

The mold 2a was of the reverse gate method. The arrangement of eight sprues 261 to 268 for the molded article 21 is shown in the plan view at top in FIG. 28. The mold 2a was used and the molded article 21 was produced in the same manner described in Example 1. In this molding, the resins in the sprues 261 to 268, the runner 27 and the first sprue 28 were thrown away after molding every time.

Table 1 shows the amount of warping (mm) of the molded articles produced in Examples 1 to 14 and Comparative Example 1, together with the quantities (g) of the material used for molding.

TABLE 1

| | Molding method | Warping (mm) | Used quantity of material (g) |
|---|---|---|---|
| Example 1 | Hot runner | 0.7 | 200 |
| Example 2 | Hot runner | 0.5 | 150 |
| Example 3 | Hot runner | 0.5 | 150 |
| Example 4 | Hot runner | 0.4 | 150 |
| Example 5 | Hot runner | 0.3 | 150 |
| Example 6 | Hot runner | 0.5 | 150 |
| Example 7 | Hot runner | 0.5 | 150 |
| Example 8 | Hot runner | 0.4 | 150 |
| Example 9 | Hot runner | 0.7 | 200 |
| Example 10 | Hot runner | 0.3 | 150 |
| Example 11 | Hot runner | 0.3 | 150 |
| Example 12 | Hot runner | 0.3 | 150 |
| Example 13 | Hot runner | 0.3 | 150 |
| Example 14 | Hot runner | 0.3 | 150 |
| Comparative Example 1 | Cold runner | 1.5 | 450 |

It is clear from Table 1 that the amounts (weights) of the material used for producing molded articles were extremely small in comparison with that of the conventional molding using cold-runner sprues shown in Comparative Example 1, since each of the moldings in Examples 1 to 14 was hot-runner injection molding using hot-runner sprues.

In Examples 1 and 9, four gates (hot-runner sprues) were arranged outside the molded article, and the flow of the resin was rather imbalanced. So, the molded articles obtained were rather greatly warped. On the contrary, in the other examples, since all the gates (hot-runner sprues) were located within the projected face of the molded article, the molded articles obtained were further less warped. Among them, in Examples 5 and 10, since all the gates (hot-runner sprues) were located within the projected face of the molded article and vertically and horizontally symmetrical, the obtained molded articles were still further less warped.

In Comparative Example 1, the weight of sprues thrown away after completion of molding was as large as 300 g. In Examples 1 and 9, the weight of sprues thrown away was 50 g. In the respective examples and Comparative Example 1, the weight of every molded article was 150 g.

In Comparative Example 1, since the gates of the respective sprues could not be controlled because of cold-runner injection molding, the flow of the resin was likely to be imbalanced during molding, and the obtained molded articles were very greatly warped.

INDUSTRIAL APPLICABILITY

According to the FRP molded article of the invention and the production process thereof, the quantity of sprue runners, a factor for raising the cost of the product, can be greatly decreased, and a product having good appearance can be obtained. Furthermore, the product obtained is less warped on a predetermined face.

What is claimed is:

1. An FRP molded article comprising a thermoplastic resin and resin-reinforcing fibers having an average fiber length of 0.1 to 7 mm dispersed in said thermoplastic resin, wherein the molded article has on a surface thereof a depression formed by a tip of a gate pin used for opening and closing a gate provided at the tip of a hot-runner sprue in a hot-runner injection molding.

2. An FRP molded article according to claim 1, wherein said fibers are at least one kind of fibers selected from a group consisting of carbon fibers, glass fibers and aramid fibers.

3. An FRP molded article according to claim 1, wherein the length of the hot-runner sprue is 10 to 600 mm.

4. An FRP molded article according to claim 1, wherein said depression has a diameter of 0.1 to 10 mm and a depth of 2 mm or less.

5. An FRP molded article according to any one of claims 1 through 3 and 4, wherein the molded article has on a surface thereof a plurality of depressions formed by tips of gate pins used for opening and closing gates provided at the tips of a plurality of hot-runner sprues, each of said opening-closing gates being controlled independently of each other.

6. An FRP molded article according to claim 5, wherein said hot-runner sprue comprises plural hot-runner sprues and a resin passing through a first sprue of an injection molding machine communicating to said plural hot-runner sprues passes through respective resin passages and is injected from the respective gates provided at the tips of the respective hot-runner sprues substantially at the same timing.

7. An FRP molded article according to claim 6, wherein the geometrical lengths of said respective resin passages are equal to each other.

8. An FRP molded article according to claim 6, wherein there are time differences in the opening and closing timings of said respective gates.

9. An FRP molded article according to any one of claims 1 through 3 and 4, wherein said molded article is an equipment body.

10. A molded article according to claim 5, wherein said molded article is an equipment body.

11. An FRP molded article according to claim 1, wherein a volume of said resin-reinforcing fibers in said molded article is in the range of 5 to 30 wt %.

12. An FRP molded article according to claim 1, wherein said thermoplastic resin selected from a group consisting of polyamide resin and a polycarbonate resin.

* * * * *